(12) United States Patent
Allen et al.

(10) Patent No.: US 9,141,540 B2
(45) Date of Patent: Sep. 22, 2015

(54) GARBAGE COLLECTION OF INTERNED STRINGS

(75) Inventors: Joseph H. Allen, Belmont, MA (US); Moshe M. E. Matsa, Cambridge, MA (US); Eric D. Perkins, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 800 days.

(21) Appl. No.: 12/945,610

(22) Filed: Nov. 12, 2010

(65) Prior Publication Data

US 2012/0124106 A1    May 17, 2012

(51) Int. Cl.
*G06F 12/02*    (2006.01)
*G06F 17/30*    (2006.01)

(52) U.S. Cl.
CPC .................................. *G06F 12/0276* (2013.01)

(58) Field of Classification Search
CPC .................................................. G06F 12/0276
USPC .................................. 707/999.206, 816, 819
See application file for complete search history.

(56) References Cited

U.S. PATENT DOCUMENTS

| | | | | |
|---|---|---|---|---|
| 6,098,080 | A * | 8/2000 | Endicott et al. ........................ | 1/1 |
| 6,219,678 | B1 * | 4/2001 | Yelland et al. ......................... | 1/1 |
| 6,804,762 | B1 * | 10/2004 | Dussud et al. ................. | 711/170 |
| 6,836,782 | B1 * | 12/2004 | Fresko et al. ........................ | 1/1 |
| 6,839,725 | B2 * | 1/2005 | Agesen et al. ........................ | 1/1 |
| 7,519,640 | B1 * | 4/2009 | Garthwaite ............................ | 1/1 |
| 7,788,300 | B2 * | 8/2010 | Kuck et al. ..................... | 707/813 |
| 2002/0099765 | A1 * | 7/2002 | Otis .............................. | 709/203 |
| 2002/0165870 | A1 | 11/2002 | Chakraborty et al. | |
| 2008/0243968 | A1 | 10/2008 | Schmelter et al. | |
| 2008/0281885 | A1 * | 11/2008 | Dussud .......................... | 707/206 |
| 2009/0112953 | A1 * | 4/2009 | Barsness et al. .............. | 707/206 |
| 2009/0276478 | A1 | 11/2009 | Soman et al. | |
| 2009/0292749 | A1 * | 11/2009 | Garst et al. ..................... | 707/206 |
| 2012/0066193 | A1 * | 3/2012 | King et al. ..................... | 707/704 |

OTHER PUBLICATIONS

Andrew W. Appel, "Simple Generational Garbage Collection and Fast Allocation", 1989, Software-Practice and Experience, vol. 19(2), pp. 171-183.*
Benny Yih et al, "Persistent Immutable Shared Abstractions", 1992.*
Michael, M.M., "Safe Memory Reclamation for Dynamic Lock-Free Objects Using Atomic Reads and Writes", PODC, Jul. 21-24, 2002, © 2002 ACM, Total 10 pp.

(Continued)

*Primary Examiner* — Brannon W Smith
(74) *Attorney, Agent, or Firm* — Janaki K. Davda; Konrad, Raynes, Davda & Victor LLP

(57) ABSTRACT

Provided are techniques for a garbage-collected interned string table. Reference objects that each reference strings in the interned string table are created. The reference objects and the strings referenced by the reference objects in the interned string table are marked with a current generation. Garbage collection is performed by: advancing the current generation to a next generation; in response to the reference objects in a previous generation from the current generation advancing to an acquired references state, promoting the reference objects and the strings referenced by the reference objects in the previous generation to the current generation; and deleting the strings that are marked with the previous generation in the interned string table.

15 Claims, 19 Drawing Sheets

(56) References Cited

OTHER PUBLICATIONS

Sobalvarro, P.G., "A Lifetime-based Garbage Collector for LISP Systems on General-Purpose Computers", MIT, Sep. 1988, © 1988, Total 68 pp.

Wikipedia, "String interning", [online], [Retrieved on Oct. 5, 2010]. Retrieved from the Internet at <URL: http://en.wikipedia.org/wiki/String_interning>, Total 4 pp.

* cited by examiner

| | Owner's 2-bit generation | | | |
|---|---|---|---|---|
| 400 | 0 | 1 | 2 | 3 |
| None | 0 | 1 | 2 | 3 |
| 0 | 0 | 0 | 0 | 0 |
| 1 | 0 | 1 | 2 | 1 |
| 2 | 0 | 2 | 2 | 3 |
| 3 | 0 | 1 | 3 | 3 |

(Left axis: String's previous generation)

FIG. 4

GARBAGE COLLECTION OF INTERNED STRINGS

BACKGROUND

1. Field

Embodiments of the invention relate to garbage collection in string tables having strings that are no longer referenced.

2. Description of the Related Art

String interning is a commonly used technique in which a string table is used to reduce the space required for strings and to make string comparisons faster. String interning may be described as a technique of storing one copy of each distinct string value. Each string is replaced with an integer (or pointer) which is associated with that unique string. String comparisons are reduced to single integer comparisons. The space used by many copies of the same string is reduced to the space used by just the single copy in the string table. An interned string table may be described as a string table for which string interning is performed.

Thus, with some techniques, strings may be interned into a string table such that interned references to the same string (or string value) reference the same in-memory instance. That is, the reference refers to the string. In particular, if the integer or pointer for the interned string is stored, that integer or pointer is called a reference. Also, a reference may be described as a handle stored somewhere, but the reference refers to the string. That is, computer code may make use of the string, so the string can not be deleted. While string tables may provide memory and performance advantages, the string tables may overfill with strings (i.e., the string table may run out of space) or the integer type (which could be a 16-bit short word) may run out of codes if there are too many unique strings. This may lead to a denial of service vulnerability if the strings which are interned arrive over a network because an attacker need only send many unique strings to the server until the string table is full or out of codes. As another example, for an XML document having a large number of names, storing the names in a string table may cause the string table to overflow. If used carelessly, a string-table overflow may lead to poor table lookup performance, may exhaust a fixed-size handle pool, or may even exhaust system memory, resulting in performance and/or stability problems.

These problems can be solved with some form of garbage collection of the string table, in which strings which are no longer referenced are discarded.

In environments with manual memory management or when stricter control over the string table size or lifecycle is desired, recovery of unused strings is complex and specialized string table garbage collection may be required. In particular, in the absence of a system-wide module to determine reachability of the string table entries, the string table has to maintain its own data on the strings in use. This can be done with reference counts, but that will incur penalties in performance, and possibly memory, since the string table users will constantly be updating reference counts on the strings, and since such reference-counting mechanisms often depend on heavier-weight structures to deal with the reference-count update. In a system where interned strings or string handles are used extensively and passed around among various modules, the overhead of reference count updates may reduce the performance advantage that the string table provides.

In environments (i.e., platforms, languages, and/or frameworks) that provide native garbage collection, especially those with support for weak references, a well-designed string table may allow its entries to be freed by the system garbage collector, allowing free use of the string table without risking overflow. However, even in environments where native garbage collection is available, a performance-sensitive or memory-sensitive application may want to use lighter-weight references to the strings, such as small integers, or may wish to have greater control over the size of string-table or the life-cycle of the entries. For example, using a smaller fixed-size table may prove to be easier to tune for performance, but may become exhausted before the system garbage collector decides to free the entries. Similarly, using small-integer handles for strings may allow optimization of other handle-keyed tables throughout the system.

With concurrent garbage collection, other processing does not have to stop while garbage collection is underway. However, with existing garbage collection techniques, none are completely concurrent. For example, some existing garbage collection techniques lock the root set (i.e., the stack) during part of the garbage collection.

In a distributed environment having multiple nodes, memory addresses can not be used as the integer keys because the various nodes do not share the same main memory or virtual memory address spaces. Thus, the nodes can not allocate an entry in the string table for a new string without first synchronizing and checking that no other nodes have already allocated a string at that memory location. The overhead of synchronizing these memory addresses alone would be high-cost and high-complexity. Some systems run completely separate processes on the various nodes and pass the full strings between nodes. This has the drawback that the optimized data structures used on one node can't be passed between nodes.

Thus, there is a need for improved garbage collection techniques.

BRIEF SUMMARY

Provided are a method, computer program product, and system for a garbage-collected interned string table. Reference objects that each reference strings in the interned string table are created. The reference objects and the strings referenced by the reference objects in the interned string table are marked with a current generation. Garbage collection is performed by: advancing the current generation to a next generation; in response to the reference objects in a previous generation from the current generation advancing to an acquired references state, promoting the reference objects and the strings referenced by the reference objects in the previous generation to the current generation; and deleting the strings that are marked with the previous generation in the interned string table.

BRIEF DESCRIPTION OF THE SEVERAL VIEWS OF THE DRAWINGS

Referring now to the drawings in which like reference numbers represent corresponding parts throughout:

FIG. 4 illustrates a table used for promoting a string to a new generation in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
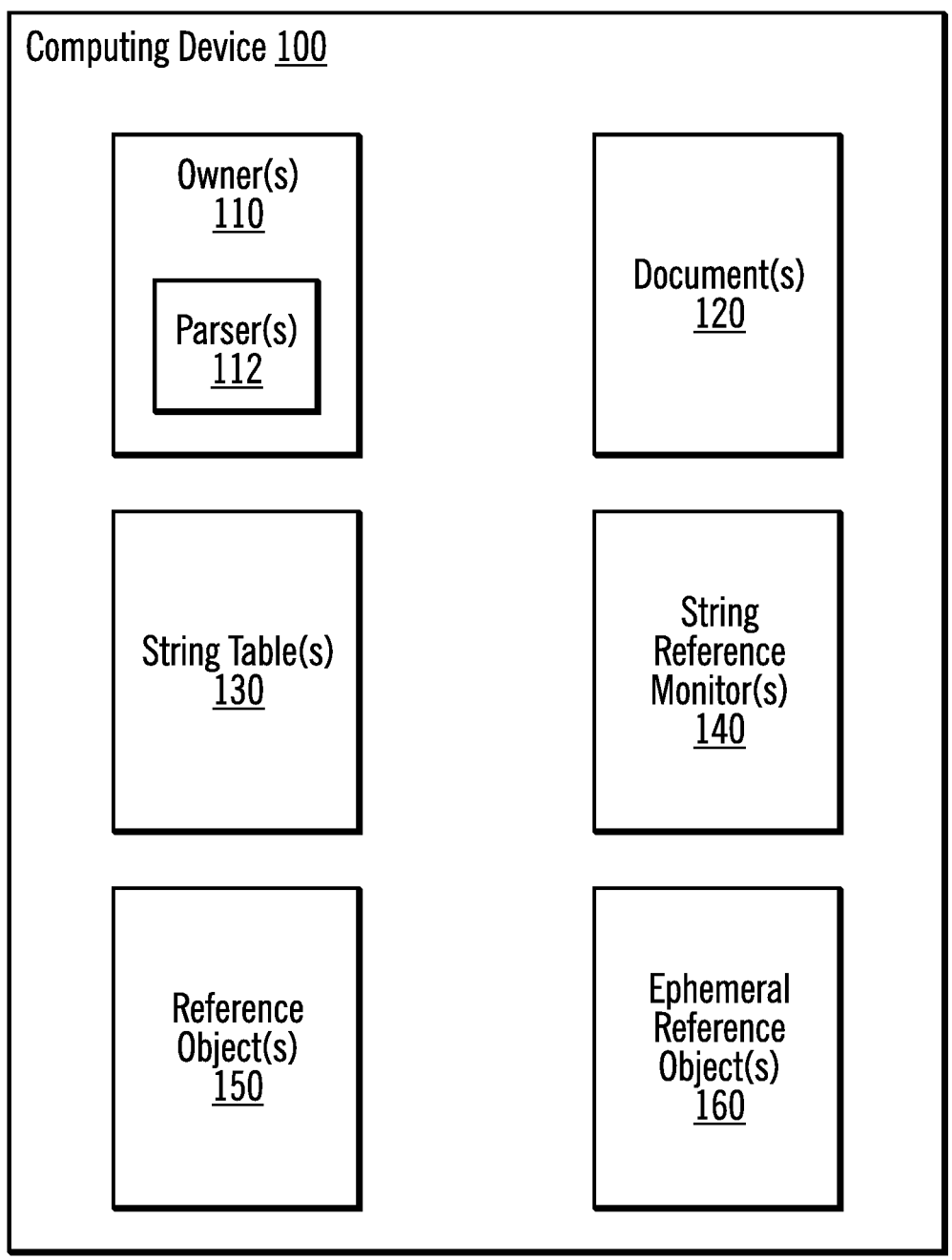
FIG. 1 illustrates, in a block diagram, a computing device in accordance with certain embodiments.

FIG. 1 illustrates, in a block diagram, a computing device 100 in accordance with certain embodiments. The computing device 100 includes one or more owners 110 (e.g., data structures, applications and/or processes), one or more documents 120, one or more string tables 130, one or more string reference monitors 140, one or more reference objects 150, and one or more ephemeral reference objects 160. In certain embodiments, the one or more documents 120 are XML documents, and one or more of the one or more parsers 112 is an XML parser. The one or more parsers 112 parse the one or more documents 120 to obtain strings, convert the strings to integer handles, and store the integer handles and corresponding strings into the one or more string tables 130. In certain embodiments, each entry of the one or more string tables 130 is associated with a different string. The one or more parsers 112 are examples of the one or more owners 110. The one or more owners 110 may include any function, stored procedure or other component that uses the one or more string tables 130. The one or more string tables 130 may also be referred to as interned string tables.

In certain embodiments, the one or more owners 110 and the one or more string reference monitors 140 use a lazy, collective reference mechanism combined with efficient, concurrent reference tracking mechanisms to provide an efficient technique of tracking entry references in the one or more string tables 130. The collective reference may be described as a reference into the one or more string tables 130 made by a collection of related data structures, which are managed together for simplicity and improved performance. In particular, in certain embodiments:

References to entries in the one or more string tables 130 are tracked collectively, minimizing the number of references that are tracked by the one or more string reference monitors 140 for the one or more string tables 130.

String references are calculated lazily, such that a given collective-reference need not maintain a list of the actual referenced table entries, but rather is capable of collecting such a list in the (rare) event of the reference still being active during a garbage collection attempt.

In the event of a garbage collection attempt, the current list of open collective references is traversed to mark the used entries in the one or more string tables 130, and a subsequent sweep is used to remove the unused entries. A simple free-list may be used to reassign recycled entries. In other embodiments, a simple bit vector may be used to indicate free entries.

Synchronization of the one or more string tables 130 with respect to garbage collection is also performed collectively, ensuring that lookups in the one or more string tables 130 remain efficient, wait-free operations.

Embodiments allow for the use of the one or more string tables 130 to be limited-size in many situations where that would not otherwise be possible, with minimal performance impact. Embodiments provide garbage collection that allows the one or more string tables 130 to remain small over long timeframes and across many workloads, without constraining the one or more string tables 130 or modifying the simple, lightweight integer handles that the one or more string tables 130 associate with the referenced strings. In certain embodiments, garbage collection is added to one or more existing string tables 130 with negligible impact on system performance (less than 1% in most cases).

Entries in the one or more string tables 130 are referenced by one or more collective reference objects 150, implementing a reference interface. In certain embodiments, the reference interface takes the following form:

Reference

Iterator GetReferencedEntries( )

Any of the one or more owners 110 that make use of entries in the one or more string tables 130 will register one or more reference objects 150 that are capable of enumerating all of the entries referenced by the one or more string tables 130. By enumerating the referenced entries, the GetReferencedEntries method enumerates the referenced strings in those referenced entries. Because garbage collection is typically a rare event, the actual enumeration of referenced entries is calculated lazily, in the event of a garbage collection attempt. As such, the performance of the GetReferencedEntries( ) query may not be critical. In certain embodiments, the one or more reference objects 150 are lightweight and easy to construct. In practice, most of the one or more reference objects 150 are not dereferenced. To support this lazy-evaluation model, some of the one or more owners 110 may use specialized implementations of the reference interface. Typically, this specialized implementation of the reference interface traverses one or more existing data structures associated with the one or more owners 110 to obtain the actual referenced entries.

As an example, in embodiments in which the one or more string tables 130 store the names of tokens in a parsed string, a parsed tree or list of tokens holds a reference object that implements the GetReferencedEntries( )method by walking the parsed tree or token list, and enumerating all of the referenced tokens. Because the one or more parsers 112 already use the parsed tree or list of tokens for its own purposes, there is minimal memory overhead for the reference (just the size of the reference object itself). Similarly, because the GetReferencedEntries method typically is rarely called, performance of the one or more parsers 112 is also minimally impacted.

Figure 2:
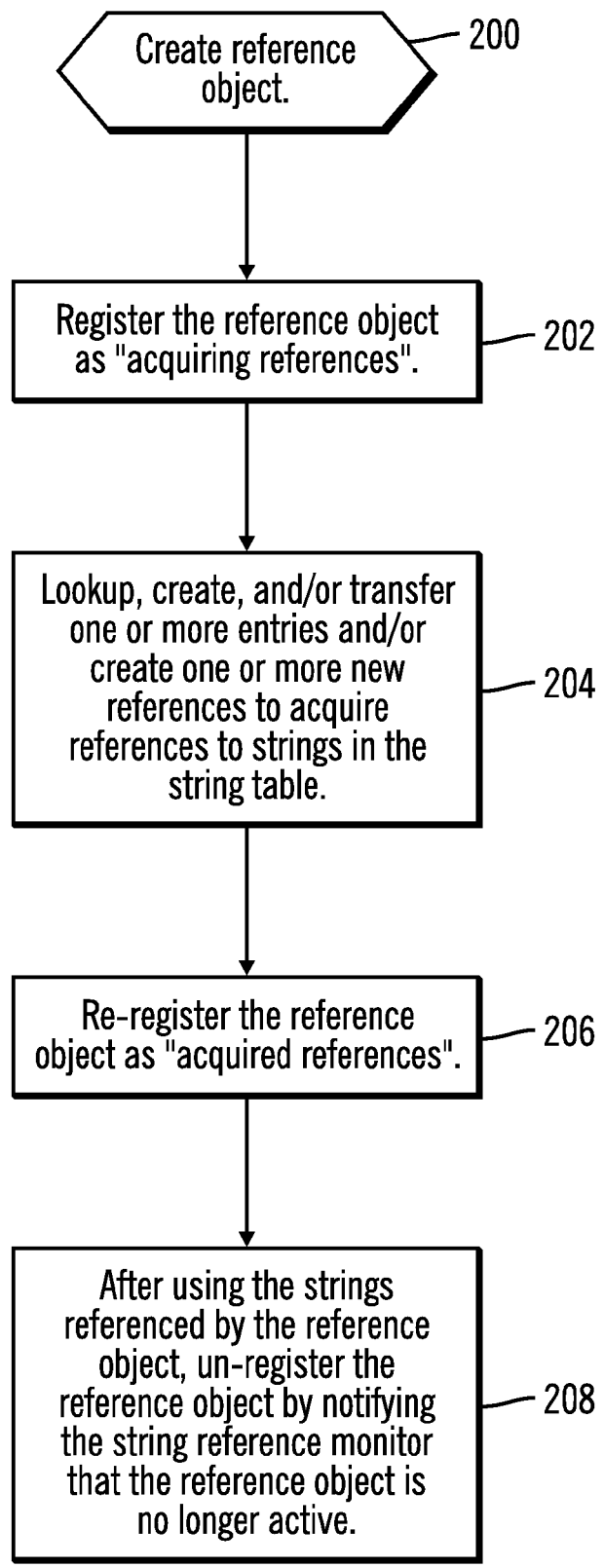
FIG. 2 illustrates, in a flow diagram, logic performed by an owner in accordance with certain embodiments.

FIG. 2 illustrates, in a flow diagram, logic performed by an owner 110 in accordance with certain embodiments. In certain embodiments, the collective reference objects 150 are managed by a string reference monitor 140. In certain embodiments, the string reference monitor 140 is implemented by a string reference monitor object, as defined by a string reference monitor class. Before acquiring string table 130 entries (either through lookup, by transferring from another data structure, function etc.), the owner 110 creates a reference object 150 and registers the reference object 150 with the string reference monitor 140.

In FIG. 2, control begins in block 200 with the owner 110 creating a reference object 150. In block 202, the owner 110 registers the reference object 150 as "acquiring references" by notifying the string reference monitor 140 to move the reference object 150 to the "acquiring references" state. In block 204, while the reference object 150 is in the acquiring state, the owner 110 may lookup one or more existing entries, create one or more new entries, transfer one or more existing entries, and/or create one or more references to previously referenced entries (i.e., copied from their own data-structures, local variables, etc.) to acquire references to strings in the string table 130. In certain embodiments, the references are to the strings, while in other embodiments, the references are to the entries storing the strings. When the references are to the strings, the entries may be determined. In block 206, once entry acquisition is complete, the owner 110 re-registers the reference object 150 as "acquired references" by notifying the string reference monitor 140 to move the reference object 150 to the "acquired references" state. While the reference object 150 is in the acquired state, the owner 110 may continue to use the string table 130 entries that have already been acquired, but may not acquire new entries. At this point, the set of entries that would be returned by GetReferencedEntries( ) does not grow. In block 208, after using the strings referenced by the reference object 150 (i.e., when the owner 110 is done using the string table 130 entries), the owner 110 un-registers the reference object 150 by notifying the string reference monitor 140 that the reference object 150 is no longer active.

In certain embodiments, the string reference monitor class may be defined as follows:
StringReferenceMonitor
void AcquireReferences(Reference Object)
void ReferencesAcquired(Reference Object)
void ReleaseReferences(Reference Object)
void GarbageCollection ( )

The string reference monitor 140 keeps track of the reference objects 150 that are in the "acquiring references" and "acquired references" states. In certain embodiments, the string reference monitor 140 maintains two sets enumerating the reference objects 150 that are in the "acquiring references" and "acquired references" states, respectively. Additionally, a Boolean is stored indicating whether garbage collection has begun, which is referred to as the "garbage collection in progress flag".

In certain embodiments, the owners 110 manipulate references with the methods AcquireReferences, ReferencesAcquired, and ReleaseReferences. In certain embodiments, these methods need not be synchronized themselves, but the implementation of the underlying sets is synchronized. In certain embodiments, the ReleaseReferences method unregisters a reference object 150.

Periodically, a garbage collection attempt is started using the garbage collection method. In certain embodiments, the garbage collection method may require synchronization (via, for example, mutex) or may be assumed to be called by the string reference monitor 140 as a separate monitoring thread. The method by which the system decides to begin a garbage collection attempt may vary by embodiments. For example, the string table 130 may call the garbage collection method directly when memory is low or the number of free entries is low, or a separate monitoring thread may periodically check for and initiate garbage collection. A user or other process could also initiate garbage collection.

Figure 3:
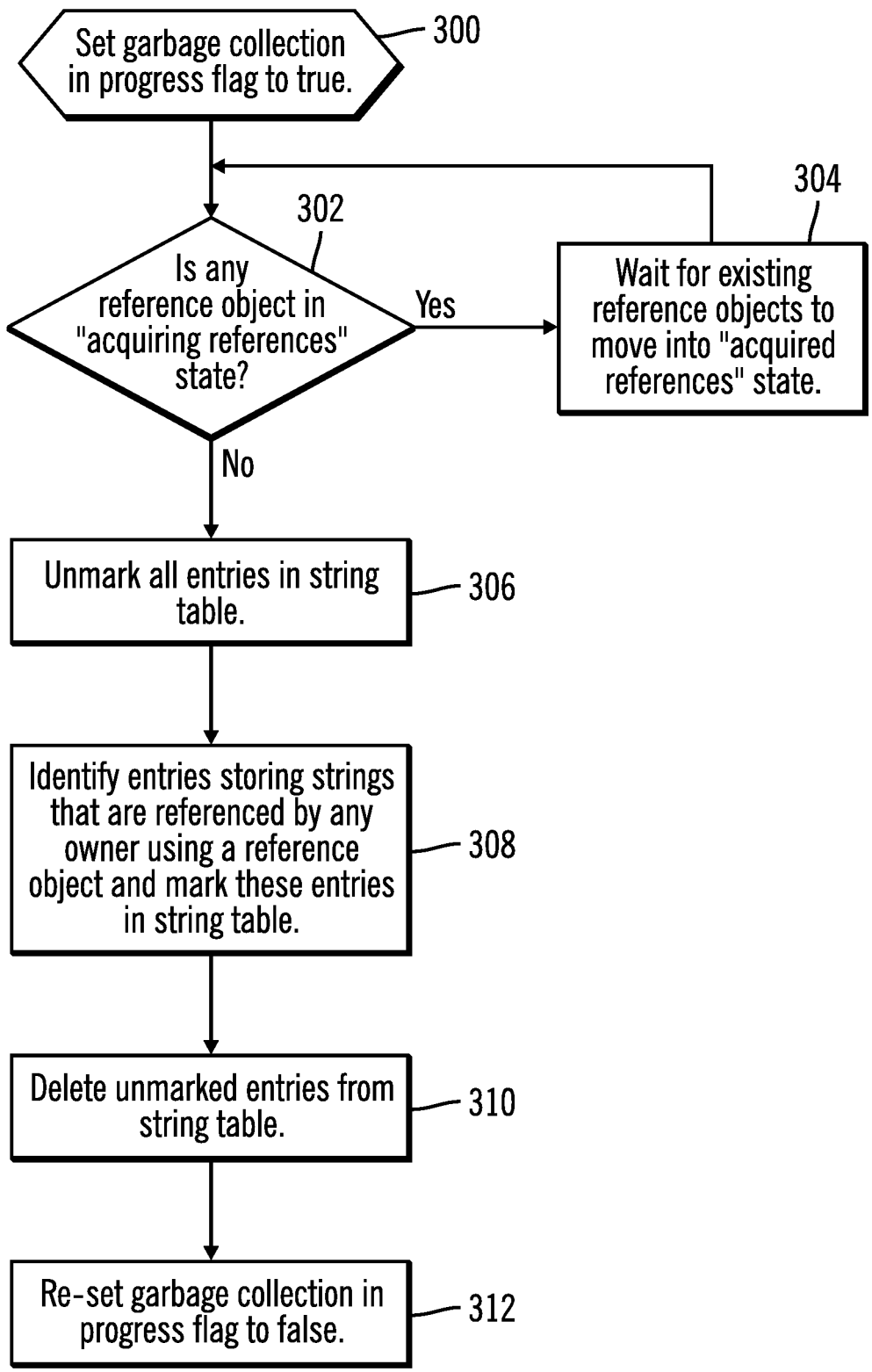
FIG. 3 illustrates, in a flow diagram, processing performed by a string reference monitor for garbage collection in accordance with certain embodiments.

FIG. 3 illustrates, in a flow diagram, processing performed by the string reference monitor 140 for garbage collection in accordance with certain embodiments. Control begins in block 300, when garbage collection is initiated (e.g., by invoking the garbage collection method of the string reference monitor class), the string reference monitor 140 sets the garbage collection in progress flag to true. At this point, the string reference monitor 140 blocks any requests to register new references in the acquiring state. In particular, in block 302, the garbage collection method of the string reference monitor 140 determines whether any reference object 150 is in the "acquiring references" state. If so, processing continues to block 304, otherwise, processing continues to block 306. In block 304, the garbage collection method waits for the reference objects 150 that are acquiring references to move into the "acquired references" state. From block 304, once the reference objects 150 have moved into the "acquired references" state, processing loops back to block 302. In block 306, once there are no reference objects 150 that are acquiring references, the garbage collection method unmarks all entries in the string table 130. In block 308, the garbage collection method identifies the entries storing strings that are referenced by an owner 110 using a reference object 150 and marks these entries in the string table 130. In certain embodiments, in block 308, the garbage collection method uses the existing references in the acquired references set maintained by the string reference monitor 140 to mark the entries. In block 310, the garbage collection method deletes (i.e., removes) unmarked entries from the string table 130. In block 312, the string reference monitor 140 re-sets the garbage collection in progress flag to false.

FIG. 3 illustrates a simple, blocking technique. In alternative embodiments, the garbage collection method may be made re-entrant, such that garbage collection is called repeatedly until the process succeeds.

In certain embodiments, the implementation of the string table 130 is not constrained by the string reference monitor 140. For example, the string table 130 add/lookup methods do not need special synchronization against any of the string reference monitor methods (though the string table 130 might have some synchronization for the add/lookup methods). Further, the string table's delete method does not need to be synchronized against the add/lookup methods, since the delete method is only called from the string reference monitor 140 while the string reference monitor 140 has already ensured that no add/lookup can occur within the string table 130.

Since the StringReferenceMonitor::AcquireReferences( ) method may block on the garbage collection method, embodiments should avoid a potential deadlock where a given thread has a reference in the acquiring state and tries to open another before moving the first reference into the acquired state. In alternate embodiments, the AcquireReferences method may be modified to fail when the garbage collection in progress flag is set to true, allowing the owner 110 that is trying to acquire references to take other action and avoiding a deadlock.

Embodiments provide concurrent garbage collection for string tables. Such concurrent garbage collection removes several blocking sections and removes the danger of reference-acquisition deadlock. Concurrent garbage collection also makes the performance characteristics of the system more uniform.

With embodiments, the reference objects 150 with references to strings and the strings themselves are marked with a generation code. The generation code of the reference object 150 is used as the initial generation code for newly created strings and also is used when a reference is added to an existing string. The generation of the string may be "promoted" (i.e., re-marked) to the generation of the reference object 150 if that generation is newer. To disambiguate which reference object 150 is newer when there are multiple reference objects 150 in different generations, multiple generation codes are used. In certain embodiments, three or more generation codes are used. Each entry in the string table 130 has a string, an integer value that is bound to the string, and a generation for that string.

The owners 110 are defined to be in one of two states: the "acquiring references" state or, after acquiring is complete, in the "acquired references" state. During garbage collection, the generation is advanced so that new owners 110 are created in the new generation. The garbage collector method then waits for all owners 110 in the previous generation to move to the "acquired references" state. Finally, the garbage collector method scans all of the strings from these owners 110, promoting them to the new generation. When this is done, any strings remaining in the previous generation are not referenced so they may be safely deleted.

Thus, instead of blocking new owners 110 from being created during garbage collection so that the garbage collector does not have to try to scan the new owners 110 while they are in the acquiring references state, with embodiments, new owners 110 are permitted to be created during garbage collection, but in a new generation. These owners 110 still do not have to be scanned since the strings that they reference or create are not subject to being deleted owing to that fact that only strings in the previous generation can be deleted.

The final result is that garbage collection is completely concurrent with the rest of the system processing. Owners 110 can be acquiring new references to strings while garbage collection is running. At no point does the system have to stall, even for short periods of time, because owners 110 are only scanned when they are in the "acquired references" state (i.e., when they do not have to be locked to be scanned).

Thus, in certain embodiments, with concurrent garbage collection, strings which are going to participate in garbage collection are marked as being in one of three generations. Such strings can be "promoted" from an older generation to the next newer generation. The three generations form a promotion cycle: generation 2 is newer than generation 1, generation 3 is newer than generation 2, generation 1 is newer than generation 3. Given any two generations, one is newer than the other.

Each string is promoted from the previous generation to the current generation for the string to be preserved. Strings which remain in the older generation are discarded. Note that this use of the term "generation" is different than its usual meaning for garbage collection. The usual meaning is that memory objects are divided into age-sets where newer sets are collected more frequently than older sets.

In some embodiments, there is also a generation used for marking permanent strings, such as keywords. In some embodiments this generation can be referred to as generation zero ("0"), or the "forever" generation. Strings marked in generation 0 are not discarded, are ignored by the garbage collection process, and are not promoted to another generation.

References to strings are "owned" by data objects and their associated methods. Such reference objects 150 can be in one of two states throughout their lifetime, they may start out actively acquiring new references or they may have acquired all the references they need. A reference object 150 is said to be in the acquiring state or in the acquired state. An example owner 110 which itself owns a reference object 150 is an XML Document Object Model (DOM). During parsing, the document tree is being created so the reference object 150 is in the acquiring state. Once parsing is complete, the result is an immutable tree so the reference object 150 is in the acquired state. Another example of an owner 110 is a C-compiler front-end. When a C-file is being read in and tokenized, the C-compiler's reference object 150 is in the acquiring state. After tokenization is complete, the C-compiler's reference object 150 is in the acquired state since no new strings will be created or referenced.

Reference objects 150 may be discarded when they are no longer needed. The full system then can have many owners, some in the active acquiring state and some in the acquired state. If an owner 110 such as a data structure, process, etc. needs to be in the "acquiring" state at multiple points in time, then the owner 110 can hold a different reference object 150 for each range of time when the owner 110 is acquiring, and move the reference objects 150 individually into the "acquired" state and individually unregister the reference objects 150.

When an acquiring reference object 150 is created, the reference object 150 is marked as being in the current generation: 1, 2 or 3. If an existing string is encountered by the reference object 150, which is marked as being in the previous generation, the string is promoted to the owner's generation. If a previously unknown string is encountered, the string is created and marked with the owner's generation.

At some point, the current generation is advanced to the next newer generation and any new owners 110 are created in this new generation. There can be acquiring owners 110 in two different generations. If they both encounter the same string, promotion will always occur towards the newer generation.

FIG. 4 illustrates a table 400 used for promoting a string to a new generation in accordance with certain embodiments. Table 400 represents how a string's generation is modified when created or accessed by a reference object 150 belonging to an acquiring owner 110 in accordance with certain embodiments.

When a reference object 150 changes to the acquired state, the reference object 150 remains with references to strings. The reference object 150 is left marked with the generation that the reference object 150 was created with. If this happens to be the current generation, then the strings referenced by the reference object 150 are also marked with the current generation. If the reference object 150 is marked with the previous generation, then the reference object 150 may refer to some strings which are marked with the previous generation and some which are marked with the new generation, since another acquiring reference object 150 may have caused these strings to be promoted.

Embodiments use the term "generation" to collectively frame the life-cycles of a series of objects as an aid to concurrency. In a "generational" garbage collector, "old" objects are typically scanned less frequently since objects which have lived for a "long" time are likely to continue to do so (as opposed to "young" objects which are more likely to be short-lived). With embodiments, interned strings and collective string-references are assigned a rotating generation (1→2→3→1) which allows embodiments to segregate strings which are being scanned for garbage collection from those which are newly allocated or otherwise newly used and promoted (concurrently with the garbage collection attempt). With embodiments, strings which are still referenced by existing objects are moved out of the old generation until the old generation contains only unused strings, at which point the entire old generation may be deleted.

Figure 5:
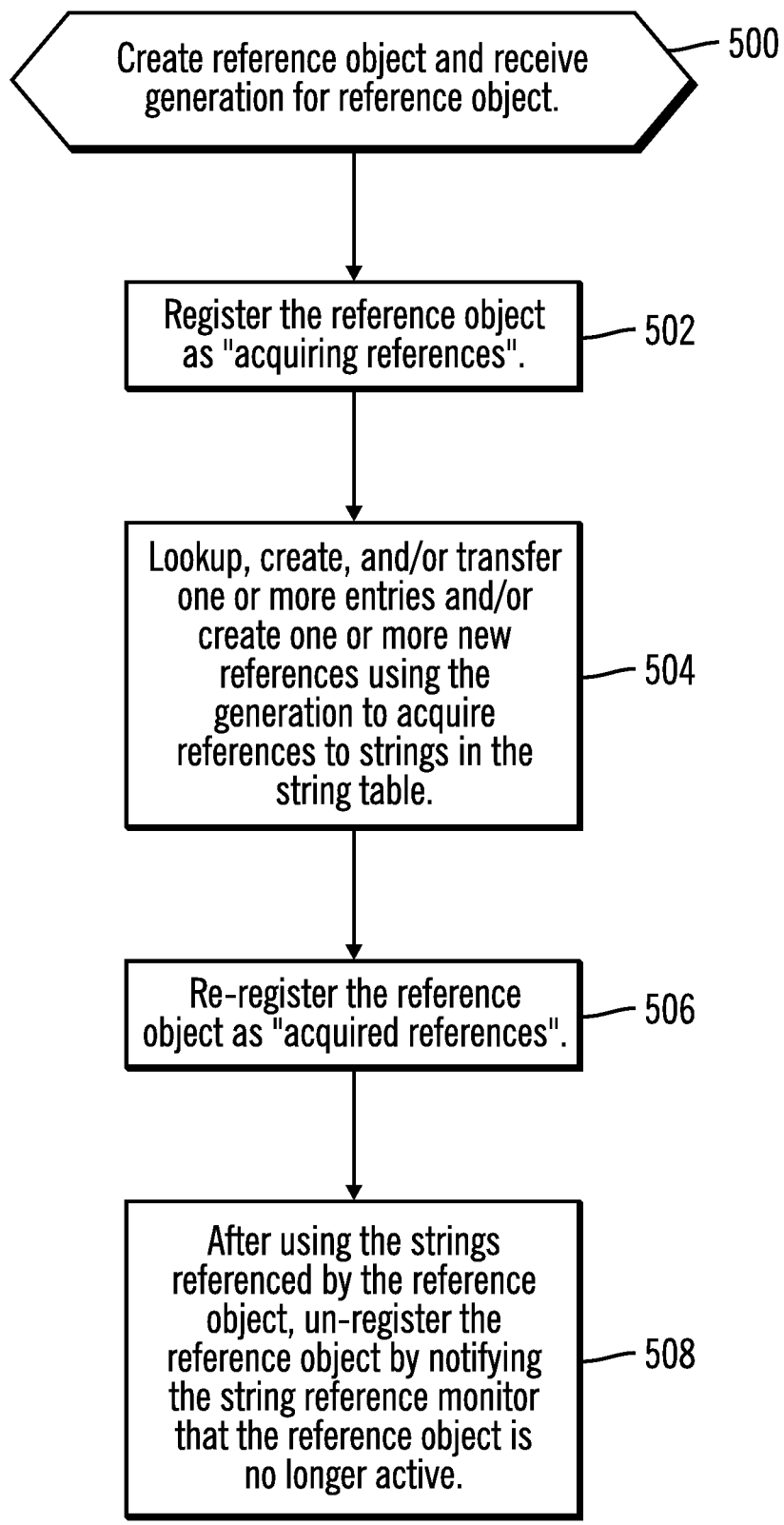
FIG. 5 illustrates, in a flow diagram, logic performed by an owner with concurrent garbage collection in accordance with certain embodiments.

FIG. 5 illustrates, in a flow diagram, logic performed by an owner 110 with concurrent garbage collection in accordance with certain embodiments. Before acquiring string table 130 entries (either through lookup, creation, transfer, etc.), the owner 110 creates a reference object 150 and registers the reference object 150 with the string reference monitor 140.

In FIG. 5, control begins in block 500 with the owner 110 creating a reference object 150 and the reference object 150 receiving a generation from the string reference monitor 140. The reference object 150 references entries for strings in the string table 130. The strings referenced by the reference object 150 are marked with the received generation. In block 502, the owner 110 registers the reference object 150 as "acquiring references" by notifying the string reference monitor 140 to move the reference object 150 to the "acquiring references state". In block 504, while the reference object 150 is in the acquiring state, the owner 110 may lookup one or more existing entries, create one or more new entries, transfer one or more existing entries, and/or create one or more references to previously referenced entries (i.e., copied from their own data-structures, local variables, etc.) using the generation to acquire references to strings in the string table 130. In certain embodiments, the references are to the strings, while in other embodiments, the references are to the entries storing the strings. When the references are to the strings, the entries may be determined. In block 506, once entry acquisition is complete, the owner 110 re-registers the reference object 150 as "acquired references" by notifying the string reference monitor 140 to move the reference object 150 to the "acquired references" state. While the reference object 150 is in the acquired state, the owner 110 may continue to use the string table 130 entries that have been already acquired, but may not acquire new entries. At this point, the set of entries returned by GetReferencedEntries( ) does not grow. In block 508, after using the strings referenced by the reference object 150 (i.e., when the owner 110 is done using the string table 130 entries), the owner 110 un-registers the reference object 150 by notifying the string reference monitor 140 that the reference object 150 is no longer active.

Figure 6:
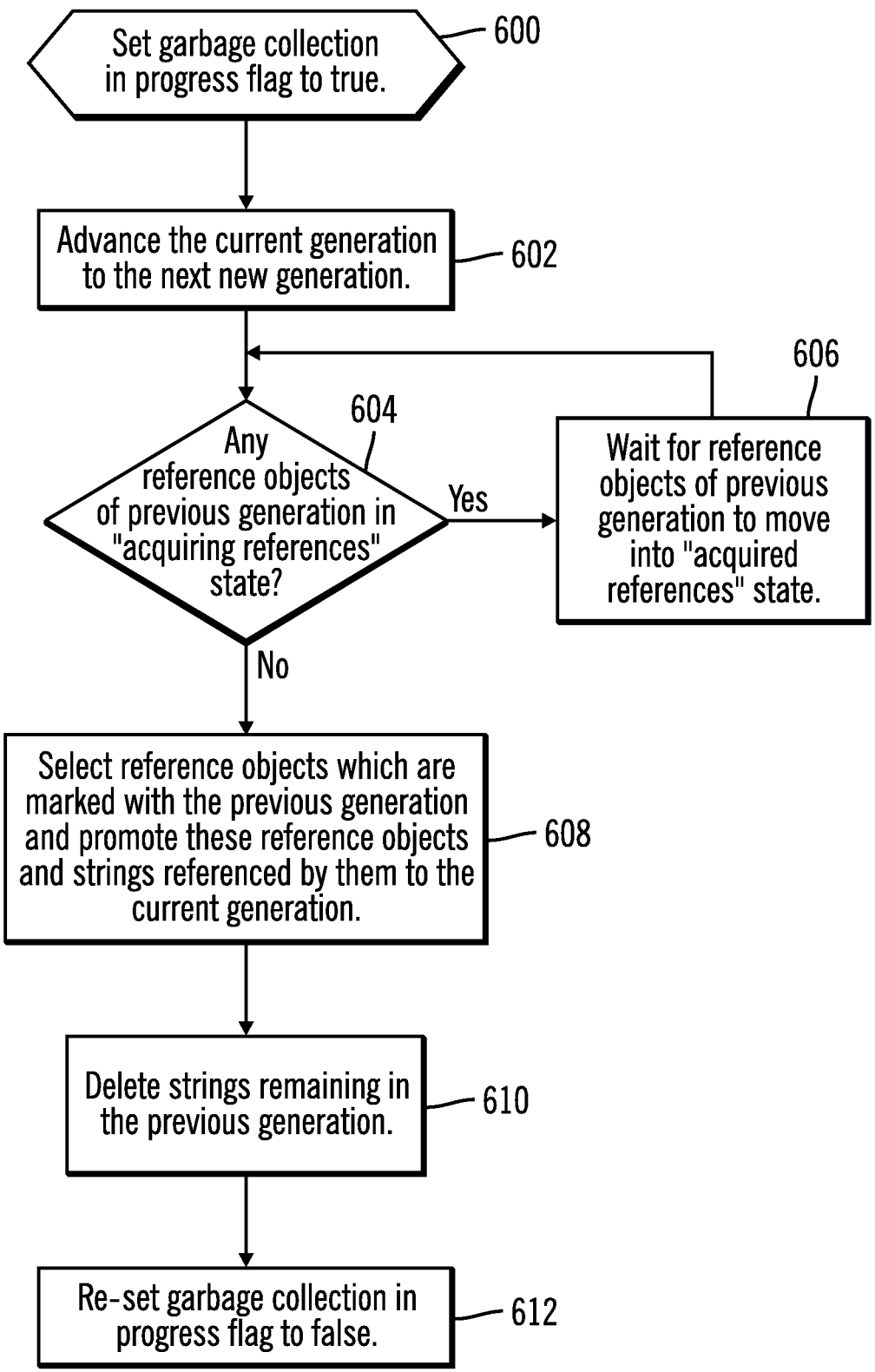
FIG. 6 illustrates, in a flow diagram, processing performed by a string reference monitor for concurrent garbage collection in accordance with certain embodiments.

FIG. 6 illustrates, in a flow diagram, processing performed by the string reference monitor 140 for concurrent garbage collection in accordance with certain embodiments. Control begins in block 600, when garbage collection is initiated (e.g., by invoking the garbage collection method of the string reference monitor class), the string reference monitor 140 sets the garbage collection in progress flag to true. At this point, the string reference monitor 140 does not block any requests to register new references in the acquiring state. In block 602, the garbage collection method of the string reference monitor 140 advances the current generation to the next new generation. Then, new reference objects 150 are assigned this new current generation.

In block 604, the garbage collection method determines whether any reference objects 150 of the previous generation are in the "acquiring references" state. If so, processing continues to block 606, otherwise, processing continues to block 608. In block 606, the garbage collection method waits for the reference objects 150 of the previous generation that are acquiring references to move into the "acquired references" state. From block 606, once the reference objects 150 have moved into the "acquired references" state, processing loops back to block 604. In block 608, the garbage collection method selects (or scans) the reference objects 150 which are marked with the previous generation and promotes these reference objects 150 and any strings referenced by them to the current generation. Thus, the garbage collection method selects each reference object 150 marked with the previous generation, in turn, to perform the promotion. Reference objects 150 marked with the current generation need not be scanned since all of their strings are already in the current generation.

In block 610, the garbage collection method deletes (i.e., removes) the strings remaining in the previous generation (i.e., no owners 110 are referencing these strings with any reference objects 150, and so these entries may safely be deleted). In certain embodiments, to delete the strings, the garbage collection method deletes the entries storing the strings. In block 612, the string reference monitor 140 re-sets the garbage collection in progress flag to false.

Embodiments provide distributed, concurrent garbage collection.

Certain embodiments enable automated garbage collection of string tables 130 while maintaining uninterrupted new allocations on a single node or a single one-node machine. Additional embodiments share a set of interned strings across nodes. A node may be described as any processing system (e.g., different threads, different machines) which share the string table 130. In certain embodiments, the nodes are cores of a process, all acting together.

To keep these nodes acting as one node for the purposes of applications that are running on the nodes, data is sent back and forth between these separate nodes. Sending strings back and forth is less efficient than sending integers representing those strings, which can be compared for equality in a single cycle, each serialized between nodes using, for example, a single 16-bit, 32-bit or 64-bit word, and re-converted back into the actual string when needed. Furthermore, more complex data structures with optimized interned strings stored in them can be serialized and shared directly between nodes, unlike solutions involving pointers.

In such a distributed environment, embodiments ensure continued allocations of references during garbage collection. Embodiments maintain a full single-node system on each node. This includes a string-table 130, a set of references on names in the string table 130, and a string reference monitor 140 which has the generation number.

Some embodiments designate one node as the master node, and the other nodes know that they are followers (i.e., not the master node).

When any node wants to allocate a new string in the string table 130, the node asks the master node and the master node responds with the proper place to put the string in the string table 130. Whenever adding a new string or removing a string, the master node sends update messages to all nodes. For most production systems, they tend to hit a steady-state where little communication is needed between nodes. If appropriate, the master node can hold back update messages and batch them as an optimization without impacting correctness.

When any node enters garbage collection, in addition to switching to the next generation, the node also sends a message to all the other nodes, forcing the other nodes to enter garbage collection and switch to that generation.

When any node finishes garbage collection, having promoted any strings that need promoting, and is ready to free any remaining strings in the old generation, then the node sends a message to the master node saying that the node is finished. When all nodes have finished the garbage collection, then the master node physically deletes any strings remaining in the old generation and sends a message to all other nodes to do the same. After any node (master node or follower) has completed the physical generation delete, the node may exit garbage collection.

Figure 7A:
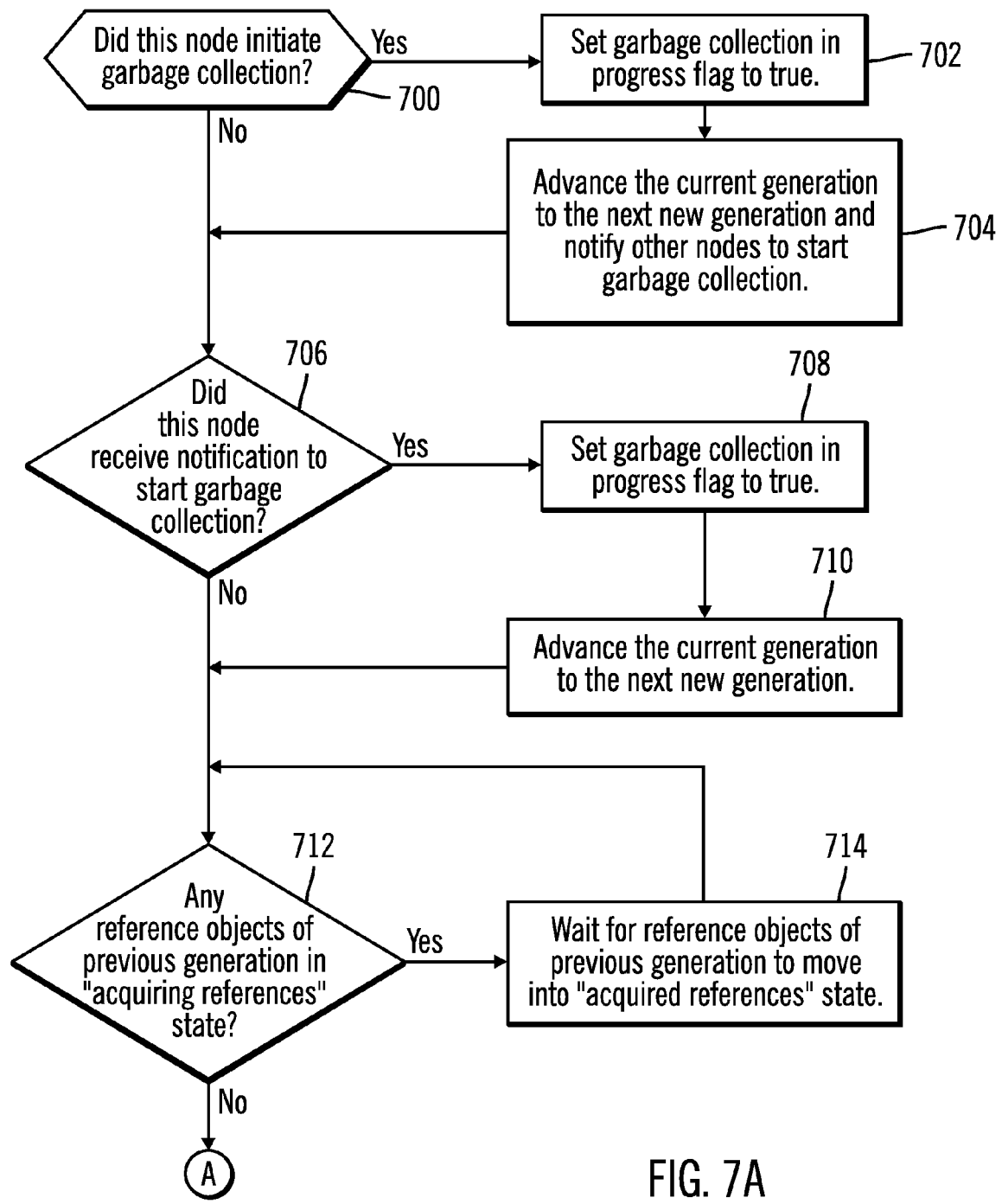
FIGS. 7A and 7B illustrate, in a flow diagram, processing performed for concurrent garbage collection in a distributed environment in accordance with certain embodiments.
Figure 7B:
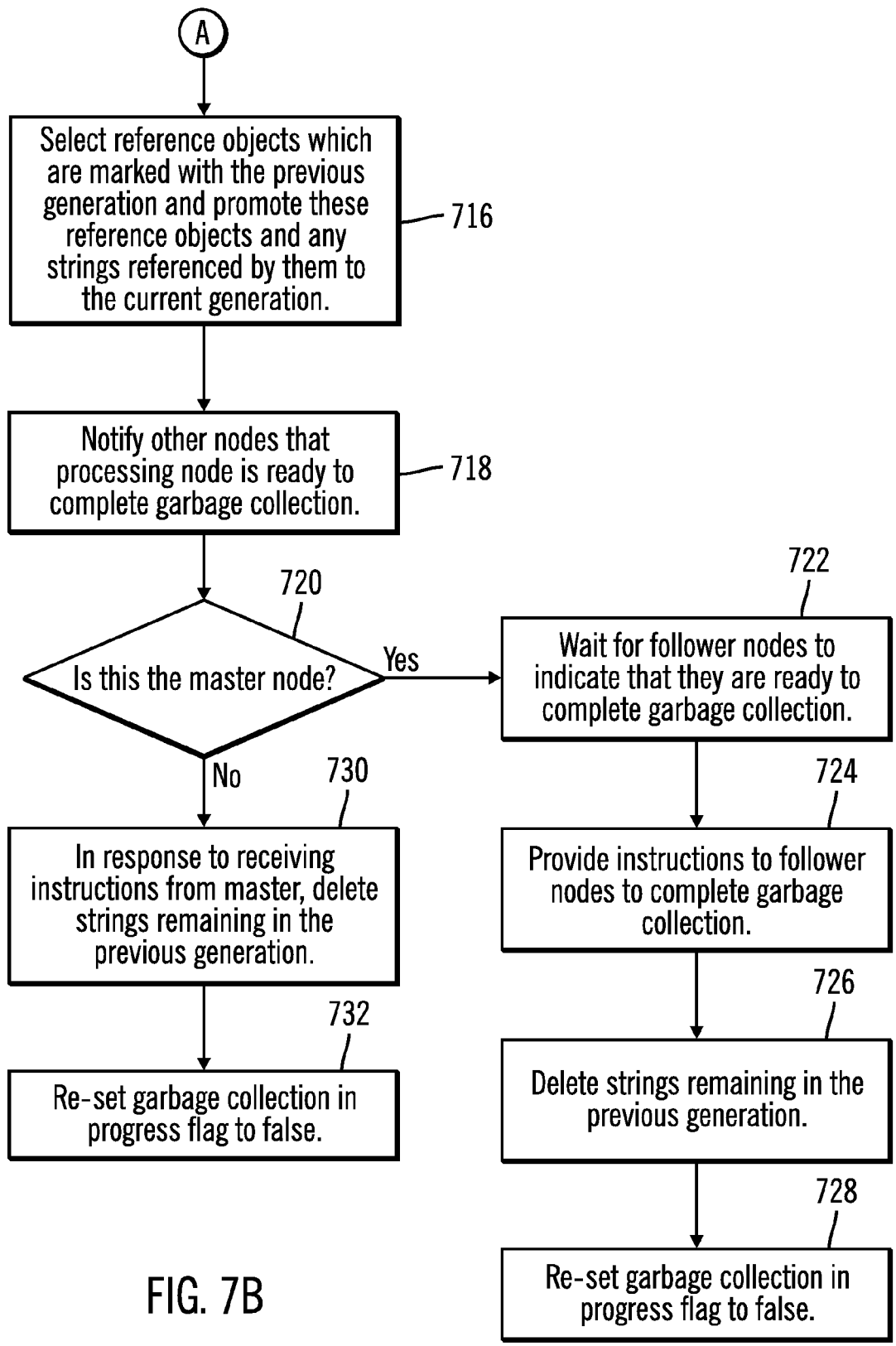

FIGS. 7A and 7B illustrate, in a flow diagram, processing performed for concurrent garbage collection in a distributed environment in accordance with certain embodiments. The processing of FIGS. 7A and 7B may be performed by the master node or a follower node, and the node performing the processing of FIGS. 7A and 7B may be the node that initiated the garbage collection or was notified to start garbage collection. Merely for ease of reference, the node performing the processing of FIGS. 7A and 7B may be referred to as the processing node.

Initially, garbage collection is initiated (e.g., by invoking the garbage collection method of the string reference monitor class) at a first node (from among the master and follower nodes in the distributed environment). This first node may be the master node or another node. When garbage collection is initiated at the first node, the garbage collection method of the string reference monitor 140 or the string reference monitor itself 140 at the first node sets the garbage collection in progress flag to true at the first node. At this point, the string reference monitor 140 at the first node does not block any requests to register new references in the acquiring state, and the string table 130 does not block any requests to add or lookup any new or existing string entries.

Control begins at block 700 with the garbage collection method of the string reference monitor 140 at the processing node determining whether this processing node initiated garbage collection. If so, processing continues to block 702, otherwise, processing continues to block 706. In block 702, the string reference monitor 140 at the processing node sets the garbage collection in progress flag to true. In block 704, the garbage collection method at the processing node advances the current generation to the next new generation and notifies the other nodes to start garbage collection. Then, new reference objects 150 are assigned this new current generation at any node.

In block 706, the garbage collection method at the processing node determines whether this processing node received a notification to start garbage collection. If so, processing continues to block 708, otherwise, processing continues to block 712. In block 708, the string reference monitor 140 at the processing node sets the garbage collection in progress flag to true. In block 710, the garbage collection method at the processing node advances the current generation to the next new generation. In block 712, the garbage collection method at the processing node determines whether any reference objects 150 of the previous generation are in the "acquiring references" state. If so, processing continues to block 714, otherwise, processing continues to block 716 (FIG. 7B). In block 714, the garbage collection method at the processing node waits for the reference objects 150 of the previous generation that are acquiring references to move into the "acquired references" state. From block 714, once the reference objects 150 have moved into the "acquired references" state, processing loops back to block 712. From block 712 (FIG. 7A), processing continues to block 716 (FIG. 7B). In block 716, the garbage collection method at the processing node selects the reference objects 150 which are marked with the previous generation and promotes these reference objects 150 and any strings referenced by them to the current generation. Reference objects 150 marked with the current generation need not be scanned, and may even be in the "acquiring" state, since all of their current strings are already in current generation, and all of their future strings will always be in generations at least as new as the current generation.

In block 718, the garbage collection method at the processing node notifies the other nodes that the processing node is ready to complete garbage collection. In block 720, the garbage collection method at the processing node determines whether this processing node is the master node. If so, processing continues to block 722, otherwise, processing continues to block 730.

In block 722, the garbage collection method of the master node waits for the follower nodes to indicate that they are ready to complete garbage collection. Once the follower nodes have indicated that they are ready to complete, processing continues from block 722 to block 724. In block 724, the garbage collection method of the master node provides instructions to the follower nodes to complete garbage collection. In block 726, the garbage collection method of the master node deletes (i.e., removes) strings remaining in the previous generation (i.e., as no reference objects 150 are referencing these strings, and so they may safely be deleted). In certain embodiments, to delete the strings, the garbage collection method deletes the entries storing the strings. In block 728, the string reference monitor 140 of the master node re-sets the garbage collection in progress flag to false.

In block 730, in response to receiving instructions from the master node, the garbage collection method at the follower node deletes (i.e., removes) strings remaining in the previous generation (i.e., as no reference objects 150 are referencing these strings, and so they may safely be deleted). In certain embodiments, to delete the strings, the garbage collection method deletes the entries storing the strings. In some embodiments the instructions could be to delete all strings in the old generation. In some embodiments, the instructions could include which strings to delete. In some embodiments, the follower node might also delete strings in the old generation prior to receiving these instructions, in addition to deleting all strings in the old generation after receiving these instructions. Various embodiments represent optimizations of different scenarios. In block 732, the string reference monitor 140 at the follower node re-sets the garbage collection in progress flag to false.

FIGS. 8-16 illustrate the interaction of four nodes in a distributed environment. The illustrations of FIGS. 8-16 are merely to enhance understanding of embodiments, and various embodiments may have fewer or more nodes than four.

FIGS. 8-16 illustrate, in each node, a string table. The string table 130 is shown as a linked list. However, in various embodiments, the string table 130 may be in the form of different data structures (e.g., a hash table). Each entry in the string table 130 has a string, an integer value that is bound to the string, and a generation for that string. Each node also shows a list of reference objects 150 as a simple linked list of reference objects 150 that are associated with owners 110. However, in various embodiments, the reference objects 150 may be stored in different data structures. Each reference object 150 has a name to indicate which reference object 150 it is, a phase, and a generation. The names of the reference objects 150 are for illustration purposes and can be helpful for debugging, however, some embodiments do not contain names for reference objects 150, and some embodiments contain optional names. Phase refers to whether the reference object 150 is still acquiring references or only using references (e.g., "Registering", "Ready" or "Unregistered"). Each node also stores an overall garbage collection phase (e.g., "GC" for garbage collection occurring, "No GC" for no garbage collection, "Wait-Reg", and "Wait-Ready") and a generation.

While the nodes' string tables 130 are mirrored on all nodes, the references are all specific to the node. This is because different work is happening on each node, but they all need to agree on the string table 130 mappings in order to be able to efficiently process integers instead of the strings.

The overall distributed environment endeavors to have most new strings be on the master node. When the master node needs to add a new string to the string table, the master node will proceed and then broadcast an update message. The string will then be identically added to all nodes. In certain embodiments, as an optimization, some updates may not be sent by the master node or may be ignored by the other nodes.

Figure 8:
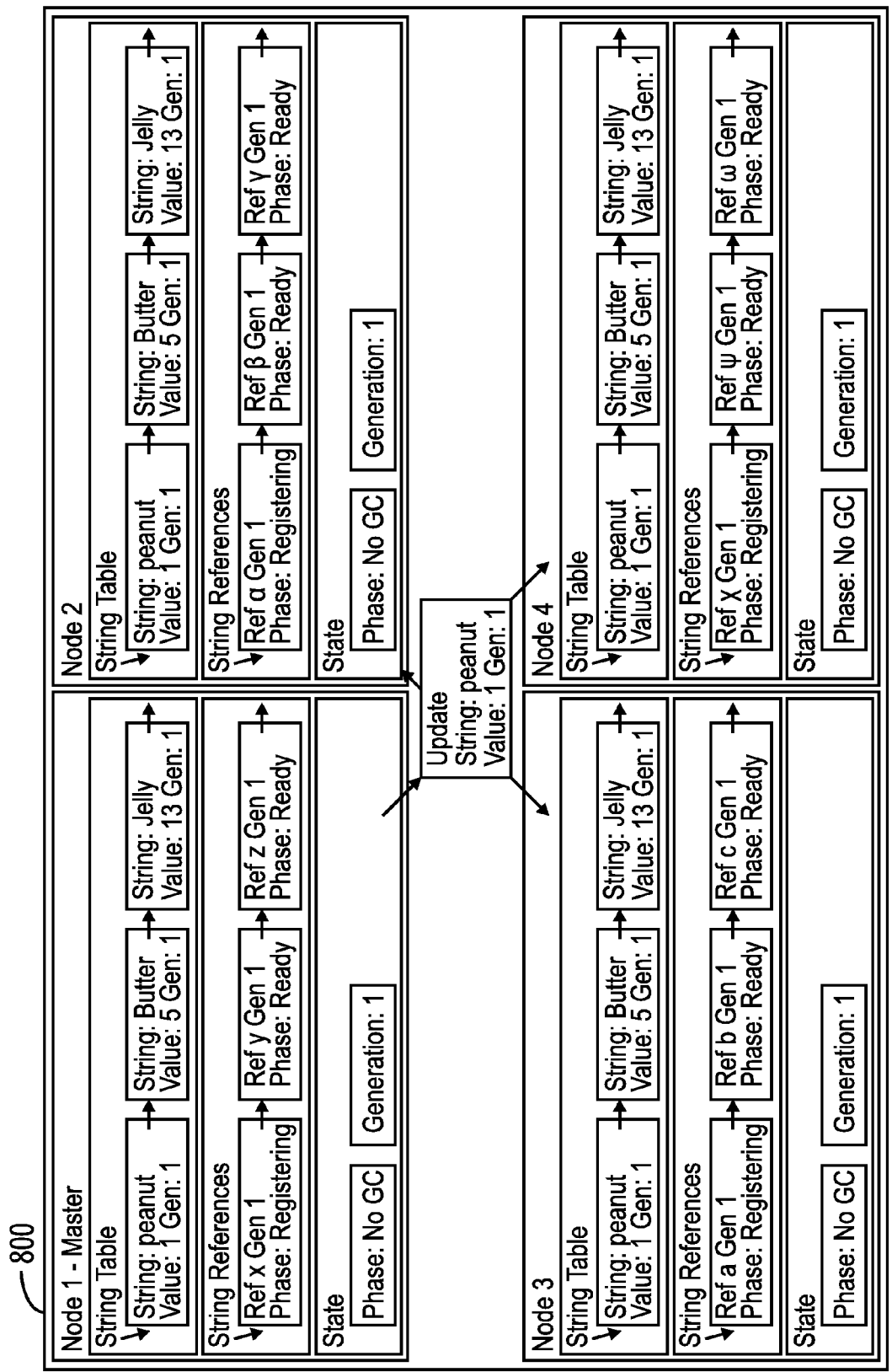
FIG. 8 illustrates an update in a distributed environment in accordance with certain embodiments.

FIG. 8 illustrates an update in a distributed environment 800 in accordance with certain embodiments. The master node issues an update for the string "peanut" in generation "1" to the follower nodes. Then, the follower nodes update their respective string tables 130 to add an entry for the string "peanut" in generation "1", or increment the generation of the string "peanut" to "1", or merely verify that the string "peanut" was already present and in the correct generation.

Figure 9:
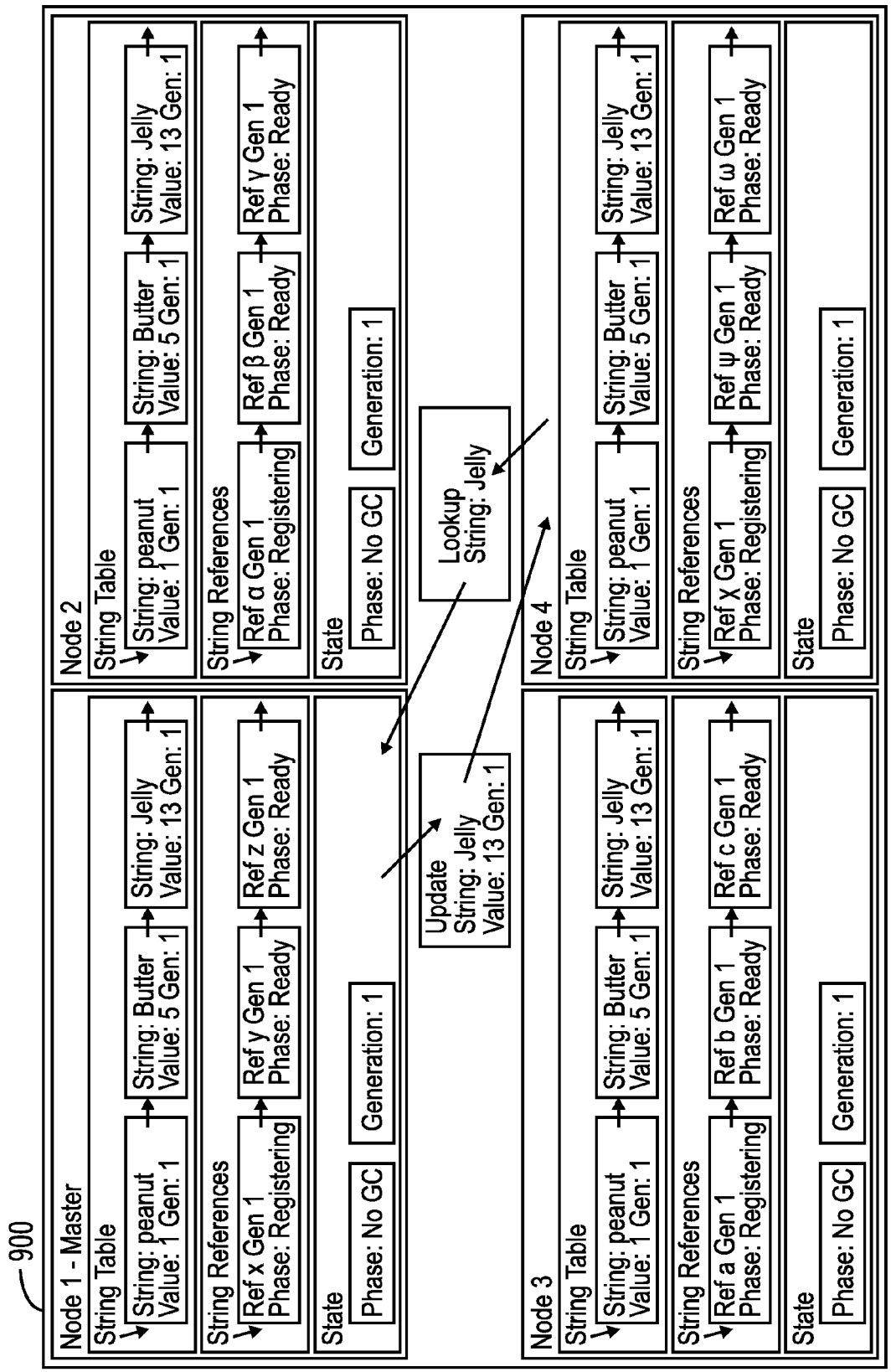
FIG. 9 illustrates lookup in a distributed environment in accordance with certain embodiments.

FIG. 9 illustrates lookup in a distributed environment 900 in accordance with certain embodiments. If a follower node needs to use a string and lookup in the local string table 130 of that node fails, then the follower node can send a message to lookup the string on the string table 130 at the master node. The master node will look up the string on the master node string table. If the string does not exist, the master node will add the string to the string table 130 and returns the result as an update to the requesting node and broadcasts an update message to all follower nodes. If the string does exist, the master node returns the result to the requesting node. In various embodiments, various message passing mechanisms may be used. In various embodiments, the amount of messages, degree of broadcast, etc. may be either increased or decreased, in order to optimize various overall performance metrics. In FIG. 9, node 4 has issued a lookup request to the master node for the string "Jelly", and the master node has issued an update to the requesting follower node for the string "Jelly". Then, the requesting follower node updates its string table 130 to add an entry for the string "Jelly" in the appropriate generation.

Figure 10:
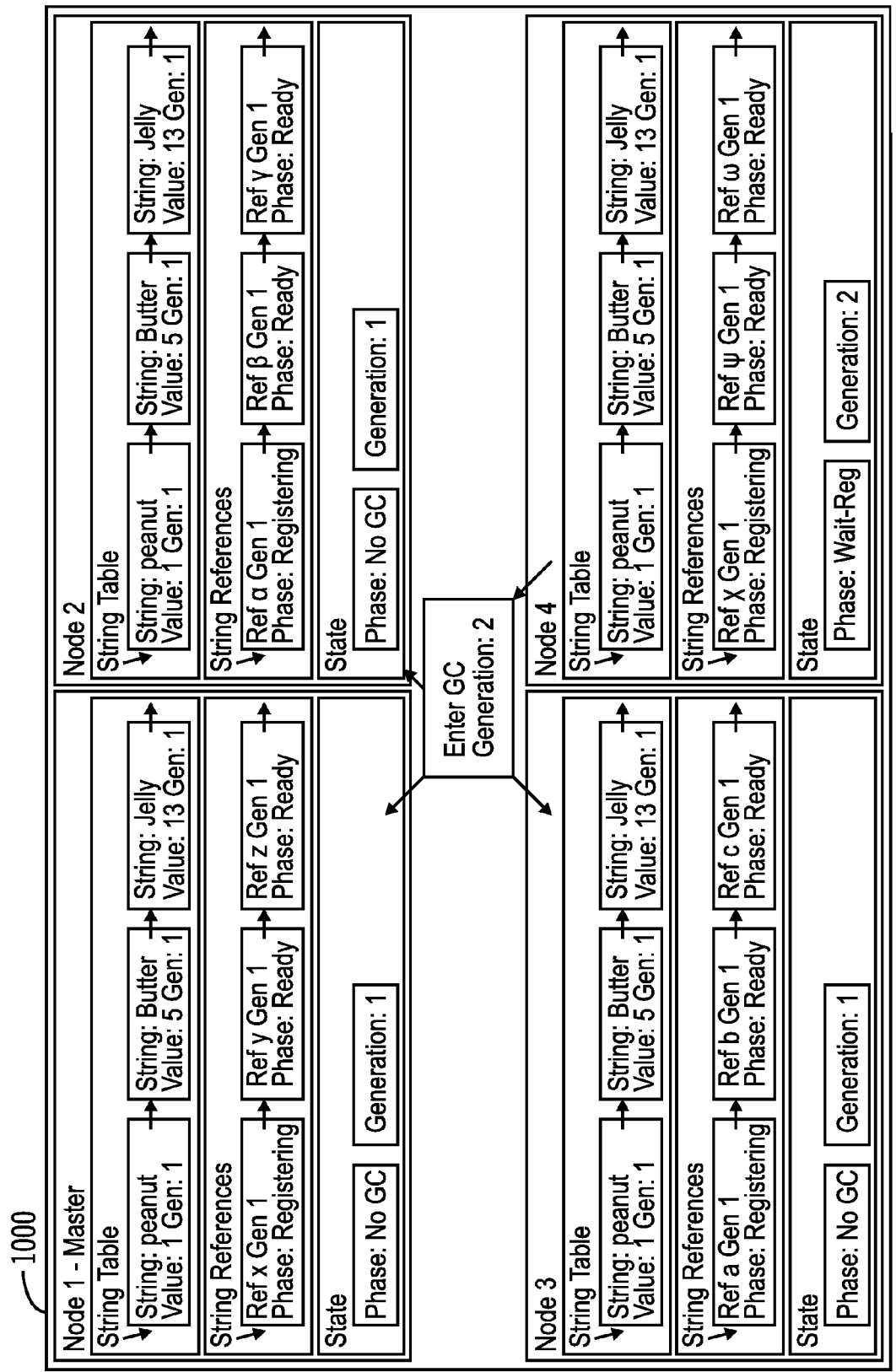
FIGS. 10-11 illustrate garbage collection in a distributed environment in accordance with certain embodiments.
Figure 11:
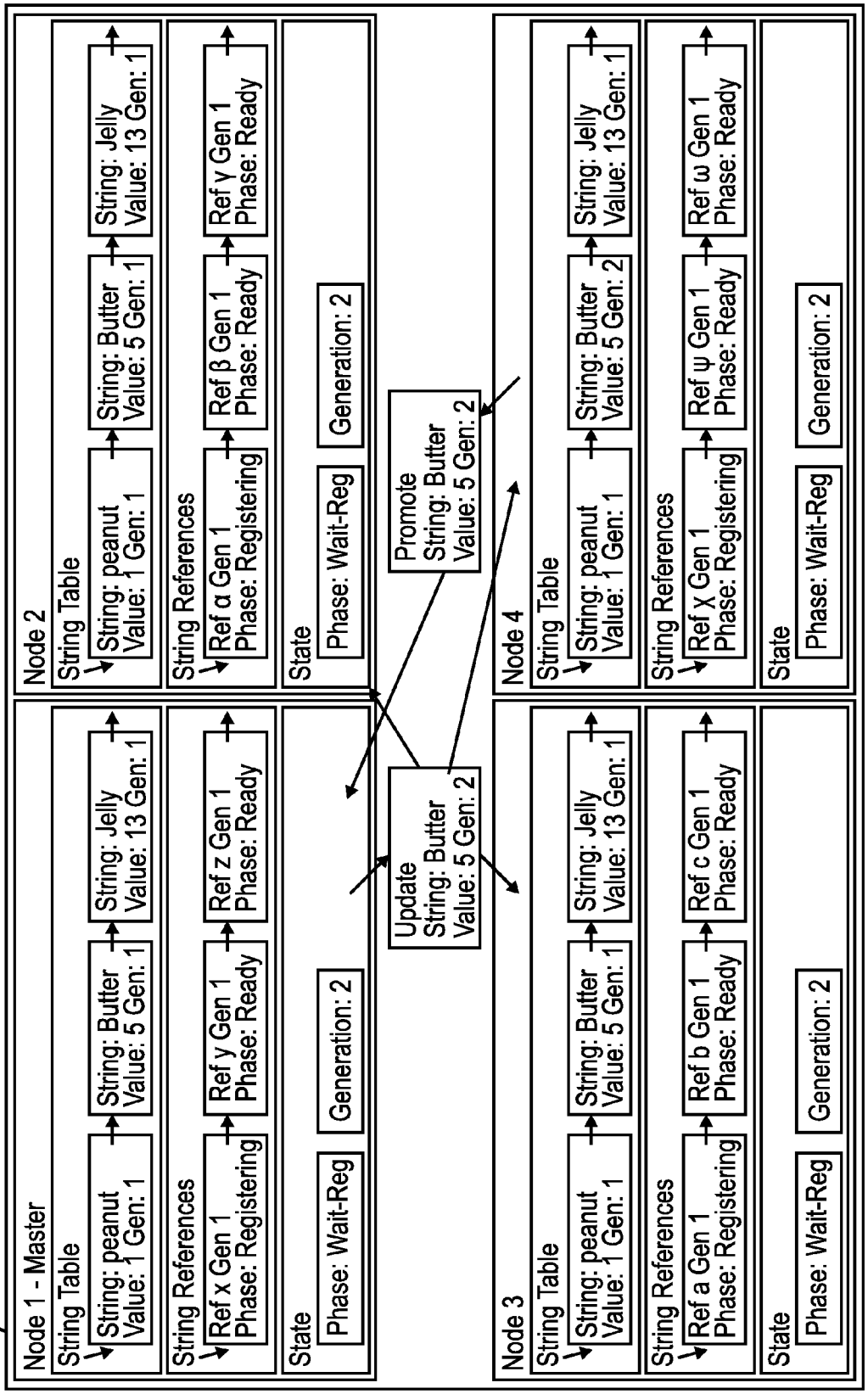

FIGS. 10-11 illustrate garbage collection in distributed environments 1000, 1100 in accordance with certain embodiments. In certain embodiments, any node can decide to initiate garbage collection. In certain embodiments, the master node initiates garbage collection because the master node is the first node to know when a certain percentage of the string table 130 has been used, and the master node generally has a complete picture of the string table. In certain embodiments, a second node other than the master node is designated as the node to initiate garbage collection (i.e., as the garbage collection master node), and this node would be the only node in control of when to enter garbage collection to divide the work so that one node (the master node) has the extra work to control the string table 130 and a different node does the extra work to control the garbage collection cycle. Various embodiments can allow any node or subset of nodes to enter garbage collection or allow group decisions either via state sharing, messages, polling, voting, or some other mechanism as the shared decision takes into account the state of all references on all nodes.

In FIG. 10, node 4 initiates garbage collection. Node 4 enters garbage collection, updates its own generation and phase, and broadcasts a message telling all nodes to enter garbage collection and move to the next generation. In certain embodiments, if several nodes broadcast such a message at the same time, all subsequently-received messages are ignored by each node. In some embodiments, the next generation is not broadcast, since the nodes can all figure out what the next generation would be by incrementing the generation if they have not initiated garbage collection or by not incrementing the generation if they already have initiated garbage collection.

In FIG. 11, when the other nodes receive these messages, they start the garbage collection process. Each node continues garbage collection until that node is ready to delete old strings from the previous generation from the string table. During garbage collection, new and continuing reference objects 150, as used by their owners 110, may progress and perform:
  adding strings to the string table
  lookup of strings in the string table
  using strings (or string values)
  adding references to strings to the references list
  changing phases of references
  removing references
  other tasks While new strings are being looked-up in both generations, some strings might need to be promoted. If a node needs to promote a string to a new generation, then that can be accomplished in certain embodiments via lookup, or in alternative embodiments via a different "promote" message. For example, in FIG. 11, assume that a string "Butter" had only ever been used in generation 1, and all nodes were now in generation 2 as part of a garbage collection cycle, and node 4 started using the string "Butter" for a new workload. In that case, node 4 would now promote the string "Butter" to generation 2. Notification of this promotion would then be sent to all nodes, either by the promoting node in certain embodiments or by the master node in alternative embodiments. Note that the master node effectively holds the master node string table, and thus applies any promotion, but other nodes are welcome to apply or ignore promotions, depending on the embodiments. Ignoring promotions might keep local string tables smaller and more focused on strings that are relevant to that node, while applying promotions might keep local string tables ready to process data structures sent from other nodes without extra time and message traffic. In some embodiments, these decisions are made at finer granularities to optimize for various workloads.

Similarly, in order to proceed to garbage collection completion in a timely fashion, any given node may need to promote one or more string references into the new generation, which would therefore require promoting zero or more strings to the new generation. This is done similarly to normal promotion to a next generation that can happen during a garbage collection cycle when an old string is also used in a new context, and a node sends a request to the master node to promote one or more strings. In certain embodiments, the promotion request may actually be a lookup request, indicating the new generation. In alternative embodiments, there may be a special message for string promotion which may or may not include several strings to be promoted. In further embodiments, lookup requests could allow multiple strings to be looked up and promoted.

Figure 12:
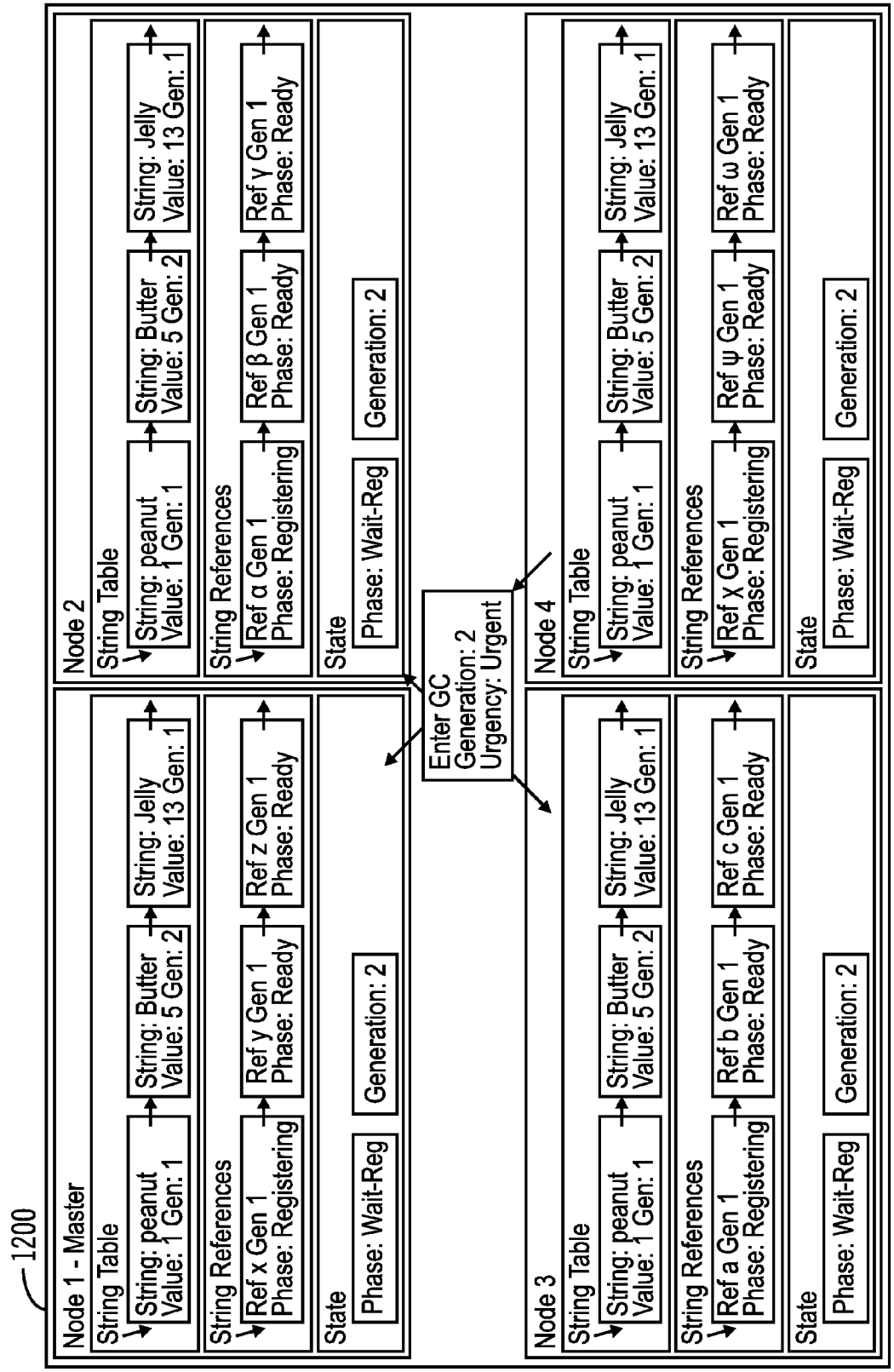
FIG. 12 illustrates urgency in a distributed environment in accordance with certain embodiments.

FIG. 12 illustrates urgency in a distributed environment 1200 in accordance with certain embodiments. During the initial phases of garbage collection, one or more nodes may want to indicate an increased level of urgency for garbage collection completion. In general, the speed with which to complete garbage collection involves a tradeoff: quickly promoting all old referenced strings achieves a faster garbage collection cycle with less waiting, but involves many more promotions. Waiting longer forces a longer garbage collection cycle, but can save both time and bandwidth by promoting many fewer strings. Additionally, the quicker garbage collection cycle may clean up fewer strings, whereas waiting longer will dereference more old strings, and thus clean them up. Thus, the proper tradeoff may be determined with knowledge of the urgency of cleanup on each of the nodes. Embodiments can communicate this urgency level between the nodes with various techniques.

Communicating the need for greater urgency would indicate that each node should more aggressively promote existing strings to speed garbage collection completion. This would be accomplished similarly to the original enter garbage collection request. This message-exchange is not required to complete garbage collection, and may not be used in some embodiments. In certain embodiments, the urgency request may take the same form as the enter garbage collection request. In certain embodiments, the urgency request may be specialized. For example, in FIG. 12 node 4 issues an enter garbage collection request with an urgency indicator. Thus, the urgency request may be part of the initial enter garbage collection request.

Figure 13:
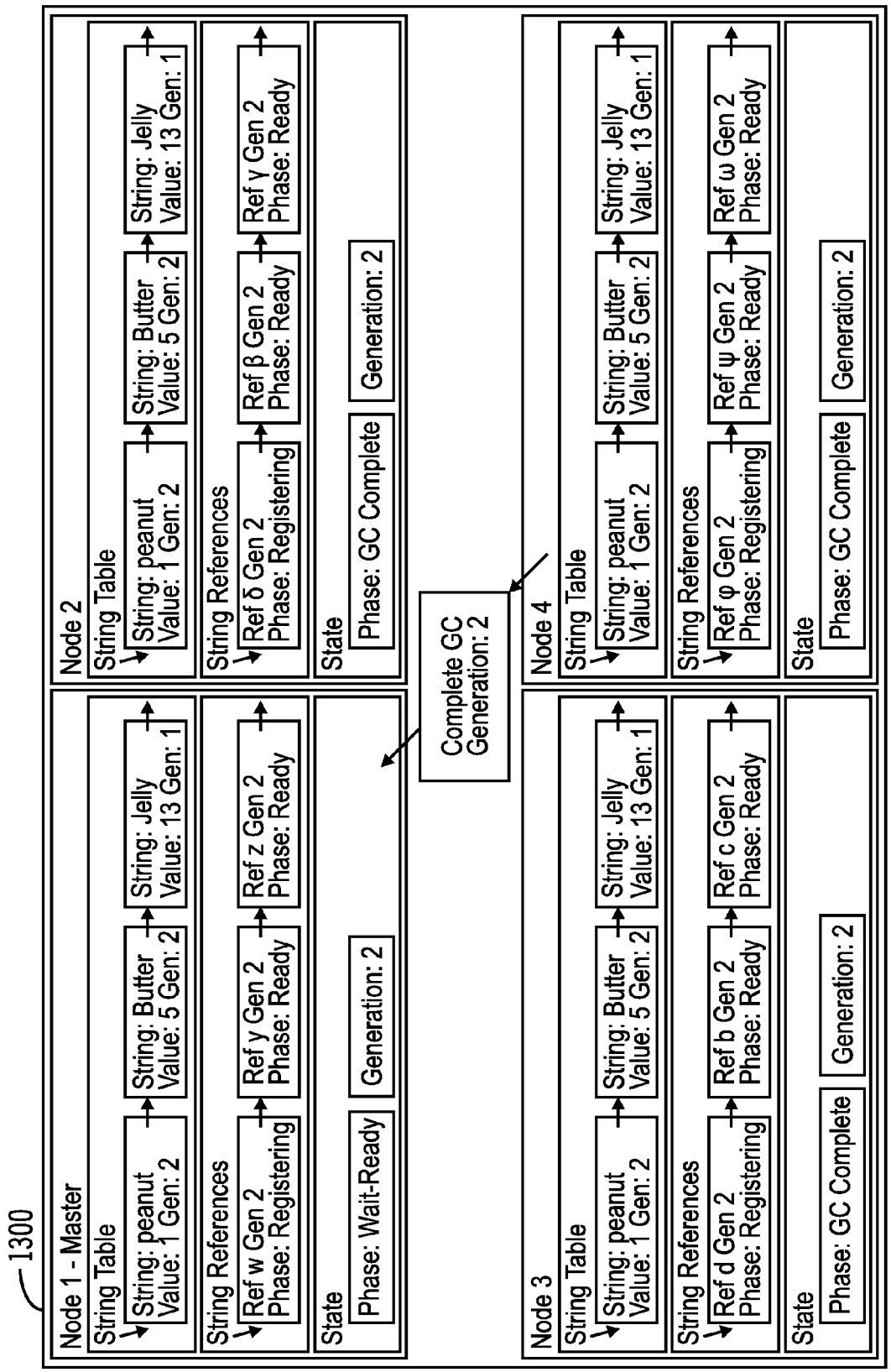
FIG. 13 illustrates single node completion of garbage collection in a distributed environment in accordance with certain embodiments.

FIG. 13 illustrates single node completion of garbage collection in a distributed environment 1300 in accordance with certain embodiments. When a given node has progressed with garbage collection so that the node no longer has any references to strings in the old generation, then the node moves into the garbage collection complete phase and tells the master node that garbage collection has been completed at that node.

In FIG. 13, assume that node 2 and node 3 have already finished garbage collection and informed the master node. Node 4 is just finishing and in the process of informing the master node. The master node is still in the process of completing the garbage collection. In some embodiments, the generation identifier would be omitted, since the generation identifier is already known by the master node.

Figure 14:
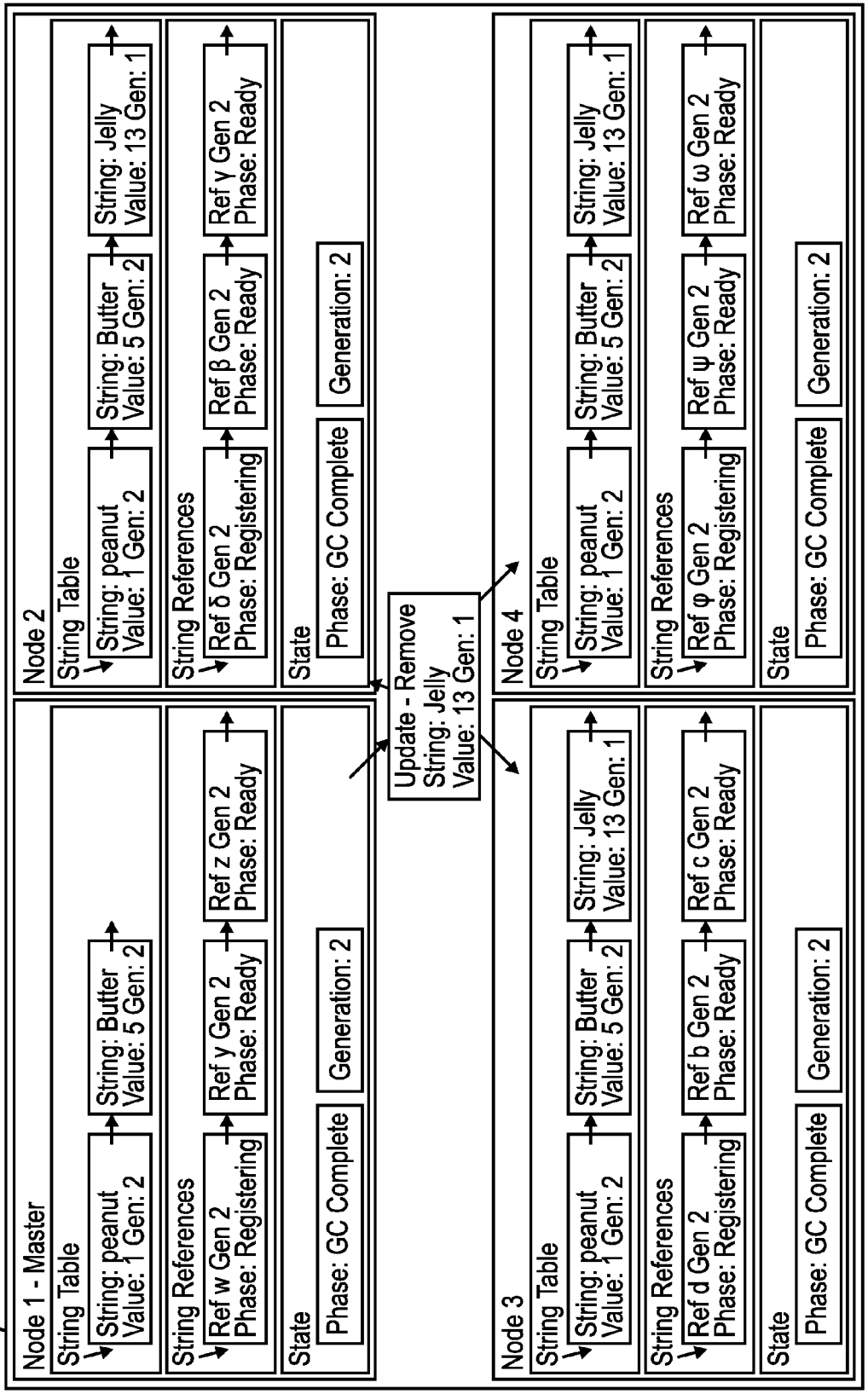
FIG. 14 illustrates string table entry deletion to complete garbage collection in a distributed environment in accordance with certain embodiments.

FIG. 14 illustrates string table 130 entry deletion to complete garbage collection in a distributed environment 1400 in accordance with certain embodiments. When the master node has been notified that all nodes, including itself, have completed garbage collection, then the master node does the actual physical delete of the old generation and sends a message to all other nodes to do the same.

In FIG. 14, the string "peanut" and the string "Butter" are still referenced by at least one node and have been promoted to generation 2, but the string "Jelly" is not referenced by any node and has not been promoted. Therefore, the string "Jelly" is still in generation 1 and will be deleted. Each node, after receiving the update message to remove "Jelly" will delete the string "Jelly" because the string "Jelly" is still in generation 1. In alternative embodiments, the master node deletes the entries in generation 1, and, during this delete, broadcasts update messages to the other nodes, which remove the entries from their own string tables 130 if those entries are still in generation 1. In some embodiments, the master node sends a single message and the other nodes know to delete all strings still in the old generation. Various embodiments may combine these approaches.

The embodiments ensure that no node will receive new strings in generation n+2 prior to completing the physical delete of strings in generation n. In certain embodiments, messages from the master node are ordered to accomplish this. In certain other embodiments, each node in garbage collection of generation n queues up any requests for addition/promotion for generation n+2 and any requests to enter garbage collection for generation n+1 until that node has completed physical deletion of generation n.

Figure 15:
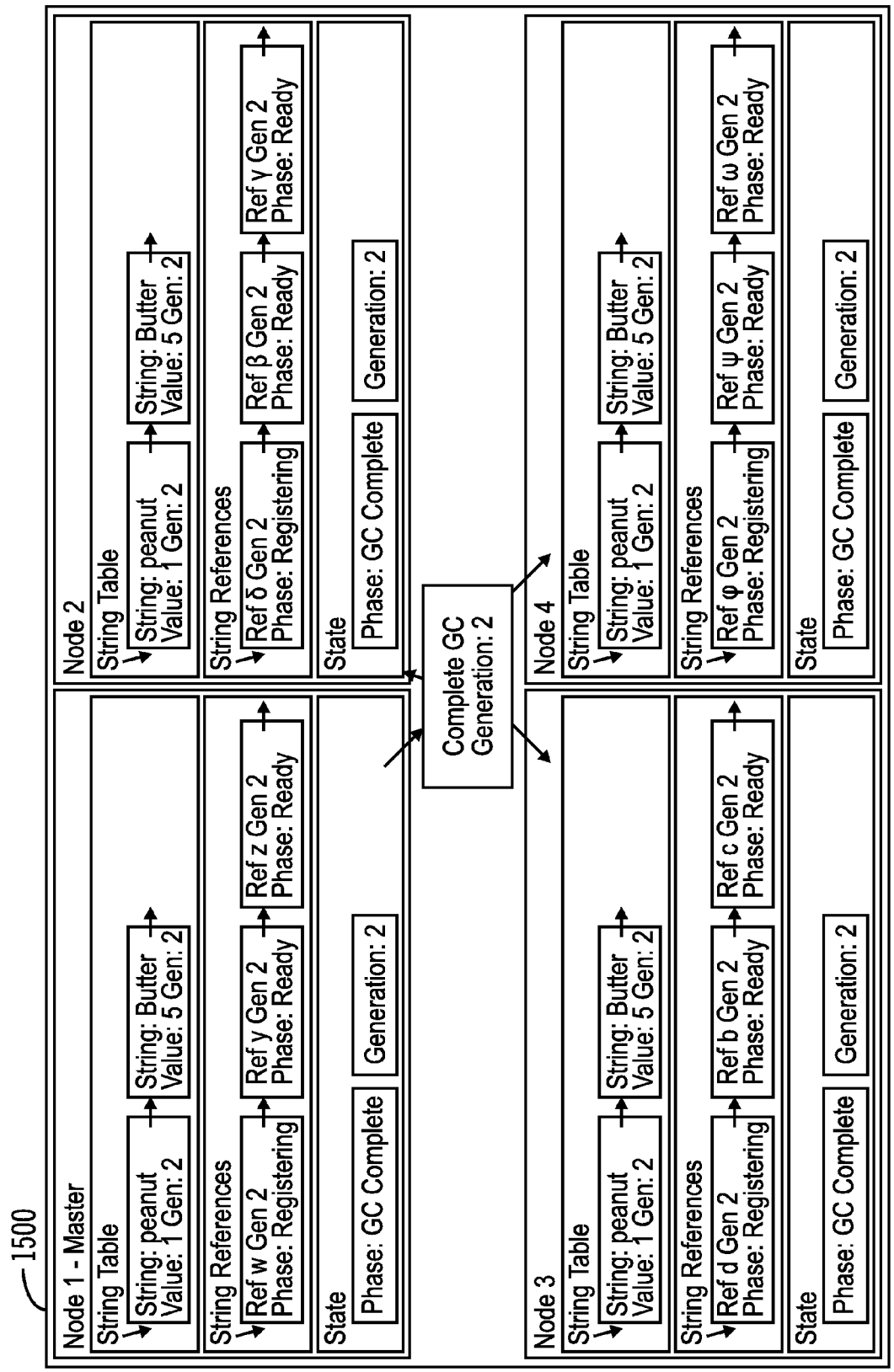
FIG. 15 illustrates completion of garbage collection by a master node in a distributed environment in accordance with certain embodiments.

FIG. 15 illustrates completion of garbage collection by a master node in a distributed environment 1500 in accordance with certain embodiments. After completing the final delete of old strings in the string table, the master node is able to complete garbage collection. In certain embodiments, the other nodes already know that garbage collection is complete by having been informed that they can physically delete any old strings. If they were informed of all deletes individually, then the master node would subsequently inform all other nodes that garbage collection is complete. Some embodiments combine the two messages of "physical delete" and "complete" into a single message.

Figure 16:
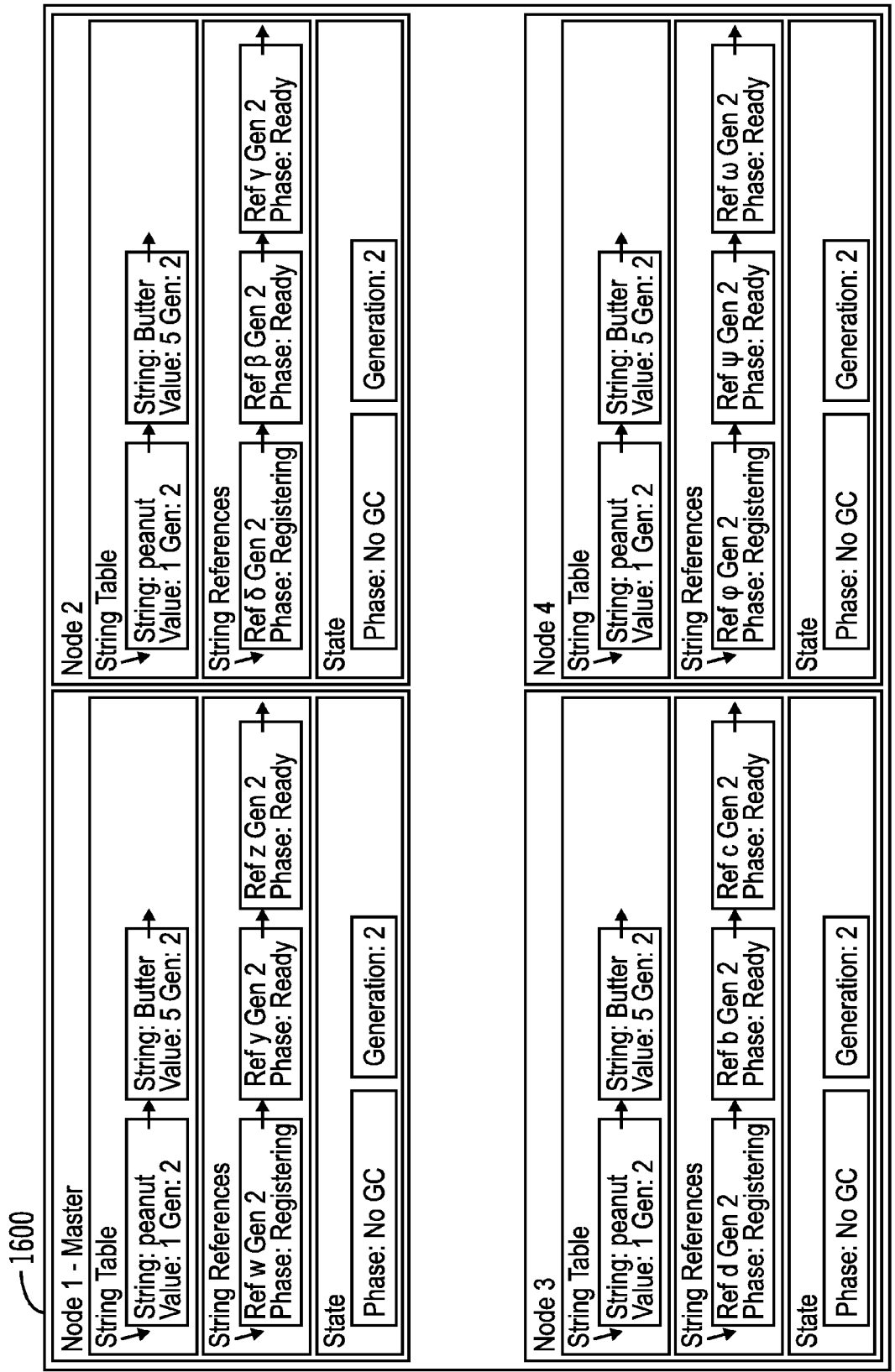
FIG. 16 illustrates a distributed environment after completion of garbage collection in accordance with certain embodiments.

FIG. 16 illustrates a distributed environment 1600 after completion of garbage collection in accordance with certain embodiments. The other nodes all leave garbage collection, and, after informing the other nodes, the master node leaves garbage collection as well. This leaves all nodes ready to continue and able to initiate garbage collection as needed. In some embodiments, the master node leaves garbage collection prior to the other nodes, and can reenter garbage collection even before the other nodes have all left garbage collection. In FIG. 16, all nodes are not in a garbage collection phase and all nodes have deleted the string "Jelly".

With embodiments in a distributed environment, the interactions between nodes are defined in such a way as to allow all of the nodes to continue processing in an independent manner, without blocking any normal processing, sacrificing none of the lock-free characteristics of the embodiments using generations to allow concurrency to the fact that the string-table and garbage-collection system are distributed.

In certain embodiments, pointers are used instead of integers. Each node can pre-allocate a section of memory at the same address range. Since the string table 130 may be finite because the string table 130 can be cleaned-up, this smaller section of memory is enough. Since this section of memory (e.g., a memory segment) is owned by the string table 130 on all nodes, nothing else needs to change.

Certain embodiments separate the master node. In various embodiments, the master node may either do or not do any other work, as any other node would. If there are few enough nodes, then one of the generally used nodes also acts as a master node. If there are many nodes, then the bandwidth of communication traffic and level of workload for the master node increases enough that a single node is the master node and does not handle any other traffic, or handles less traffic or handles only other auxiliary tasks.

In certain embodiments, there is a separate table master node and a garbage collection master node. Such embodiments physically and logically separate the master node string table 130 from the master node garbage collection controller. The master node string table 130 is the authoritative location for all strings, their values, and their generations. The master node garbage collection controller keeps track of the current generation, all outstanding nodes, and which nodes are ready to complete garbage collection, and then informs all nodes to complete garbage collection (e.g., delete strings) when all nodes are ready to complete garbage collection.

Certain embodiments use proxy nodes. Some nodes are set up in a proxy-type arrangement. One primary node requests work to be done from a secondary node. Before asking for the work, the primary node sets up a registering string reference. After the work is complete, then if the string will continue to be used, then the string reference can move to the ready state. In this way a primary node can handle the string references for a secondary node, which would not need to have a garbage collection controller. The secondary node would still have a string table, but not having to run garbage collection code can make it simpler.

Thus, embodiments in a distributed environment enable each node to fully process all old, new, and continuing workloads without any pause. The nodes only need to work with their own string references, and not any others. All nodes do their own garbage collection process, not needing a true distributed garbage collection. Garbage collection can be quickly initiated by any node. All nodes can share data loads, passing all encapsulated strings as integers. Nodes can pass data in the way they use it, not "normalizing" the data for the other nodes. All string comparison may proceed as "==" (double-equals) integer comparison in a single cycle.

Certain embodiments provide ephemeral reference objects 160 for non-native string table 130 garbage collection. In certain embodiments, "ephemeral" refers to a collective reference that corresponds to an ephemeral owner (i.e., an ephemeral running process) and not to any longer-lived data structures.

Certain embodiments use a collective, lazy reference object 150 to minimize the impact of tracking string table 130 references for owners 110. In certain embodiments, an owner 110 makes temporary use of the entries (e.g., storing the entries in local variables and discarding the entries at the end of processing) and may not have existing data structures to traverse to fulfill the reference object 150. Furthermore, such transient use is common and short-lived and thus constructing a reference object 150 to remember the used entries could cause a decrease in system performance.

To deal with this temporary reference use case, embodiments create a new, specialized reference implementation called an ephemeral reference object 160. The ephemeral reference object 160 does not keep track of the string table 130 entries used by the owner 110 that holds the ephemeral reference object 160. The ephemeral reference object 160 can return the empty set in the GetReferencedEntries query, or merely have computer code to fail the call in some way since this call is not actually made (i.e., since the call is only made on reference objects 150 in the acquired state and the ephemeral reference object 160 is never in the acquired state). The ephemeral reference object 160 proceeds directly from the acquiring state to the unregistered state. The existence of an acquiring ephemeral reference object 160 acts as a token ensuring that no string table 130 entries added or retrieved under its aegis are deleted until the ephemeral reference object 160 is unregistered. The holder of the ephemeral reference object 160 is expected to unregister the ephemeral reference object 160 relatively quickly, as compared to the expected garbage collection cycle of the system.

Through the use of ephemeral reference objects 160, an owner 110 that interacts with the string table 130 briefly, without acquiring permanent references to the string table 130 entries, or an owner 110 that simply combines or otherwise transforms existing references, again without acquiring long-term references of its own, has a lightweight alternative to the reference object 150, allowing safe interactions with the garbage collection-enabled string table 130, with minimal overhead in memory time and complexity.

Embodiments use the ephemeral reference object 160 with respect to the concurrent garbage collection systems which use generations. In various embodiments, the ephemeral reference object 160 may be used with non-concurrent garbage collection, where there are no other generations, and the AcquireReferences method simply blocks.

Noting that the string reference monitor 140 does not clean up string table 130 entries while there are open, acquiring references in the current generation, embodiments create the ephemeral reference object 160 to serve as a token to hold off garbage collection of its generation while an owner 110 executes a short-lived task or algorithm which uses and immediately disposes of a number of individual string table 130 references. The ephemeral reference object 160 does not actually enumerate the entries which the ephemeral reference object 160 references. Further, the ephemeral reference object 160 does not move to the acquired state, but instead proceeds directly to the unregistered state.

By virtue of the logical flow of the string reference monitor 140, while the ephemeral reference object 160 is open, the existence of the ephemeral reference object 160 is used to ensure that no string table 130 entries that are in the current generation from the time that the ephemeral reference object 160 was registered will be cleaned up. If garbage collection is underway when the ephemeral reference object 160 is registered, the ephemeral reference object 160 is registered with the new generation, and so no string table 130 entry obtained under its aegis is cleaned up during that garbage collection. If garbage collection begins while the ephemeral reference object 160 is registered, the current phase of the string reference monitor 140 is incremented, but the garbage collection will not proceed to deletion until the ephemeral reference object 160 is unregistered because the ephemeral reference object 160 will hold a place in the acquiring set in the string reference monitor 140.

In the case of an owner 110 performing a simple, short-lived task that temporarily uses the results of a number of table entry lookups, an ephemeral reference object 160 may be used to provide a window in which a string table 130 entries obtained through lookup may remain valid without actually being entered into a data structure that has an attached reference. The ephemeral reference object 160 is unregistered at the end of the short-lived task of the owner 110, thus releasing its virtual hold on all of the string table 130 entries in its generation.

Similarly, in the case of a more complex task of an owner 110 involving several inputs and several outputs, an ephemeral reference object 160 may be used to establish a baseline phase to which incoming and outgoing data structures may be compared, for promotion evaluations. Thus, when an input data structure is retrieved, the phase of the input data structure can be compared to the baseline phase, and if the input data structure is from the previous phase, all of its entries may be retrieved (via the GetReferencedEntries method) and promoted into the baseline phase. After promotion, the existence of the ephemeral reference object 160 is enough to ensure that none of the string table 130 entries are cleaned up for the duration of the task of the owner 110 (or the registered lifetime of the ephemeral reference object 160). Similarly, when an output structure is created, the output structure can be compared against the baseline phase, and if the output structure belongs to the newer phase, the output structure can be first populated with data, and then all of its reference table entries can be promoted (all the while continuing to exist under the protection of the ephemeral reference object 160). This allows the owner 110 to evaluate promotion in bulk for this complex task, and, given the assumption that garbage collection occurs rarely, the need to actually promote should also be rare, so the owner 110 may in general incur little string table 130 garbage collection overhead.

Without an ephemeral reference object 160, a combining or transforming owner 110 would have to either carefully track all strings as they passed from inputs to outputs, or hold on to all of the input references throughout the transforming process. Further, the owner 110 would have to assume that all of the input strings belong to the oldest generation of all of the inputs and promote conservatively. The use of the ephemeral reference object 160 allows the owner 110 to take virtual ownership of all of the table entries that the owner 110 needs (by ensuring that they are promoted to the ephemeral reference object's 160 generation), thus allowing the owner 110 to dispose of the inputs as soon as the owner 110 is done looking at them.

In certain embodiments, the ephemeral reference object 160 may be implemented independently from the string reference monitor 140 as a simplified generic reference, which is allocated and deallocated for each ephemeral reference object holder. In certain alternative embodiments, the internals of the string reference monitor 140 may be leveraged to further reduce memory and performance overhead. In particular, the string reference monitor 140 can maintain a pair of global ephemeral reference object instances (one for the current generation and, during garbage collection, one for the previous generation), which are reference-counted. When a "new" ephemeral reference object 160 is requested, the one for the current generation is returned, and its reference count is incremented. When the ephemeral reference object 160 is unregistered, its reference count is decremented.

At the beginning of garbage collection, the current ephemeral reference object 160 becomes the new previous reference, and a new ephemeral reference object 160 is created or the original previous reference is recycled as the new current reference. The switch of references would take place under the same synchronization which the string reference monitor 140 uses to change the generation.

During garbage collection, the previous ephemeral reference object 160 counts against the number of references in the acquiring state. In certain embodiments, the ephemeral reference object 160 may be entered in the reference list of the string reference monitor 140. In other embodiments, the string reference monitor 140 may treat the special ephemeral reference object 160 separately, or the ephemeral reference object 160 may not even exist physically, being represented by only the reference count.

Once the previous ephemeral reference object's 160 reference count goes to zero, the ephemeral reference object 160 is either removed from the reference list of the string reference monitor 140 or is otherwise no longer accounted for in the string reference monitor's 140 calculation of references in the acquiring state. Collecting virtual ephemeral reference objects 160 into a single reference count is a tradeoff that can be used to save both memory and the time it takes to allocate that memory (and may also, of course, improve cache coherence etc.), but also limits the ability to attach other information (stack traces, names, etc) to the reference. As such, the decision to use a reference object 150 or an ephemeral reference object 160 is based on the circumstances of a case.

Figure 17:
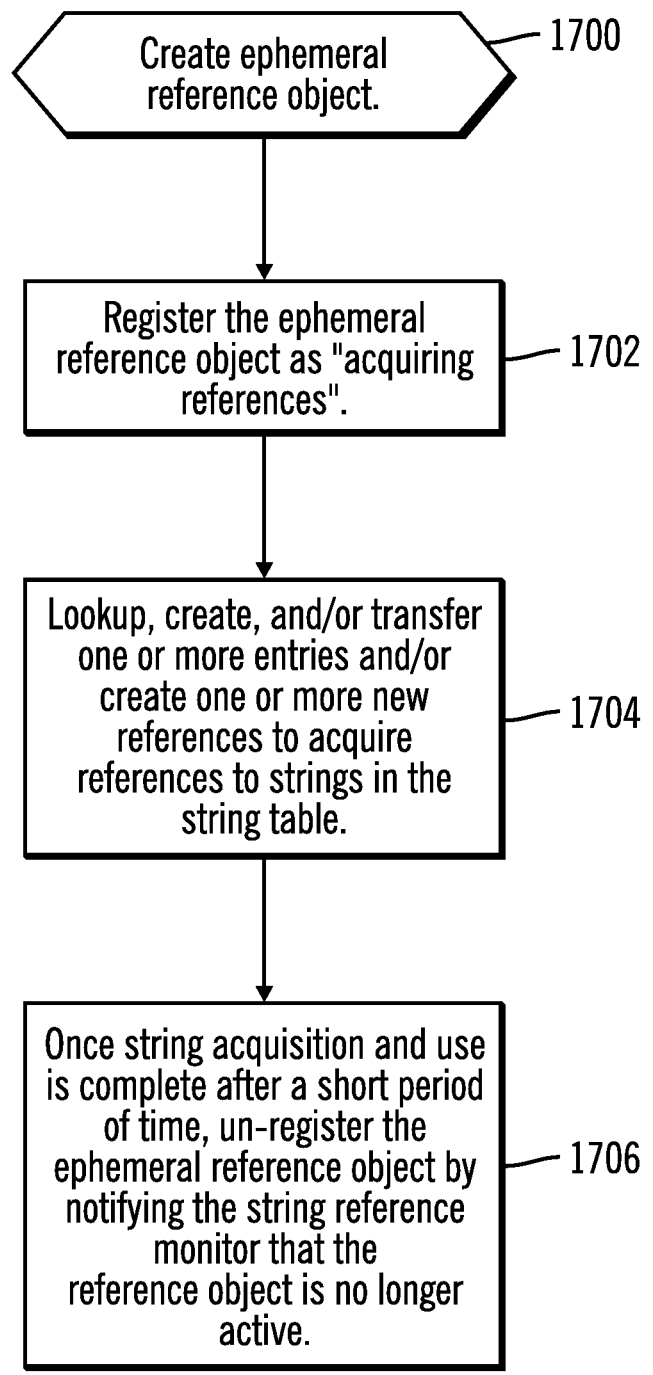
FIG. 17 illustrates use of an ephemeral reference object in accordance with certain embodiments.

FIG. 17 illustrates use of an ephemeral reference object 160 in accordance with certain embodiments. In FIG. 17, control begins in block 1700 with the owner 110 creating an ephemeral reference object 160. In block 1702, the owner 110 registers the ephemeral reference object 160 as "acquiring references" by notifying the string reference monitor 140 to move the ephemeral reference object 160 to the "acquiring references state". In block 1704, while the ephemeral reference object 160 is in the acquiring state, the owner 110 may lookup one or more existing entries, create one or more new entries, transfer one or more existing entries, and/or create one or more references to previously referenced entries (i.e., copied from their own data-structures, local variables, etc.) to acquire references to strings in the string table. In certain embodiments, the references are to the strings, while in other embodiments, the references are to the entries storing the strings. When the references are to the strings, the entries may be determined. In block 1706, once string acquisition and use is complete after a short period of time, the owner 110 unregisters the ephemeral reference object 160 by notifying the string reference monitor 140 that the reference object is no longer active.

Thus, embodiments provide garbage collection. In certain embodiments, the garbage collection is performed with concurrency on a single machine. In certain embodiments, the garbage collection is performed in distributed systems. In certain embodiments, there are specific efficiency enhancements for short-lived processes in the system using an ephemeral reference object 160. Certain embodiments address the case of a system for garbage-collection of interned strings in an environment in which there is no general-purpose (system) garbage collector, and all of the objects which refer to the interned strings are not themselves managed by any garbage collecting memory manager.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations. In certain embodiments, components, such as an owner 110 and/or the string reference monitor 140 may be implemented in software, hardware (e.g., hardware logic), or a combination of software and hardware.

Figure 18:
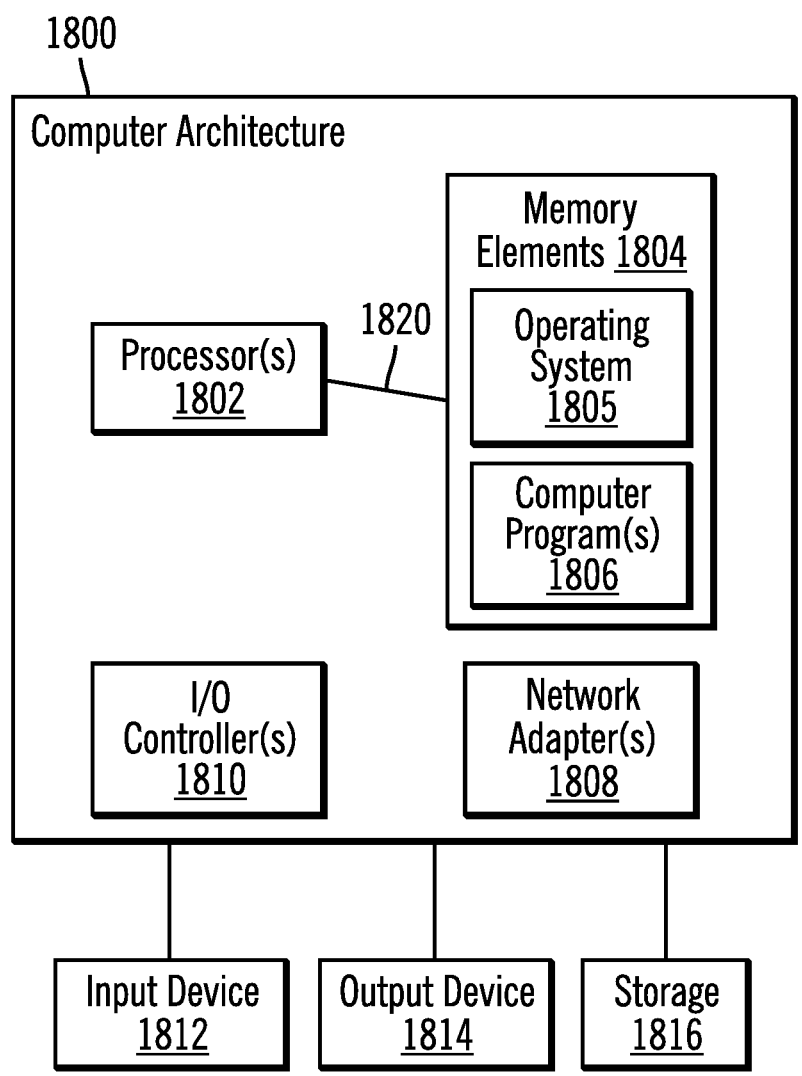
FIG. 18 illustrates, in a block diagram, a computer architecture that may be used in accordance with certain embodiments.

FIG. 18 illustrates a computer architecture 1800 that may be used in accordance with certain embodiments. Computing device 100 may implement computer architecture 1800. The computer architecture 1800 is suitable for storing and/or executing program code and includes at least one processor 1802 coupled directly or indirectly to memory elements 1804 through a system bus 1820. The memory elements 1804 may include local memory employed during actual execution of the program code, bulk storage, and cache memories which provide temporary storage of at least some program code in order to reduce the number of times code must be retrieved from bulk storage during execution. The memory elements 1804 include an operating system 1805 and one or more computer programs 1806.

Input/Output (I/O) devices 1812, 1814 (including but not limited to keyboards, displays, pointing devices, etc.) may be coupled to the system either directly or through intervening I/O controllers 1810.

Network adapters 1808 may also be coupled to the system to enable the data processing system to become coupled to other data processing systems or remote printers or storage devices through intervening private or public networks. Modems, cable modem and Ethernet cards are just a few of the currently available types of network adapters 1808.

The computer architecture 1800 may be coupled to storage 1816 (e.g., a non-volatile storage area, such as magnetic disk drives, optical disk drives, a tape drive, etc.). The storage 1816 may comprise an internal storage device or an attached or network accessible storage. Computer programs 1806 in storage 1816 may be loaded into the memory elements 1804 and executed by a processor 1802 in a manner known in the art.

The computer architecture 1800 may include fewer components than illustrated, additional components not illustrated herein, or some combination of the components illustrated and additional components. The computer architecture 1800 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for a garbage-collected interned string table, comprising:
    creating reference objects that each reference at least one of the strings in the interned string table;
    marking the reference objects with a current generation;
    marking the strings referenced by the reference objects in the interned string table with the current generation, wherein each of the strings is marked with a generation that is a same generation as that of a reference object that last referenced that string;
    and performing garbage collection by:
    advancing the current generation to a next generation;
    in response to the reference objects in a previous generation from the current generation advancing to an acquired references state in which the reference object can not obtain new references to the strings, promoting the reference objects and the strings referenced by the reference objects in the previous generation to the current generation;
    determining whether an ephemeral reference object has been created that serves as a token to hold off the garbage collection of the previous generation;
    in response to determining that the ephemeral reference object has been created, holding off on deleting all of the strings that are marked with the previous generation in the interned string table until the ephemeral reference object has been unregistered;
    and in response to determining that the ephemeral reference object has not been created, deleting the strings that are marked with the previous generation in the interned string table.

2. The method of claim 1, further comprising: for one of the reference objects, registering the reference object as acquiring references;
    acquiring the references to the strings in the interned string table;
    re-registering the reference object as having acquired the references to the strings;
    and after using the strings in the interned string table, un-registering the reference object by notifying the string reference monitor that the reference object is not active.

3. The method of claim 1, wherein one of the reference objects implements a reference interface to allow obtaining the strings referenced by that reference object and further comprising: obtaining a list of the strings referenced by that reference object using the reference interface.

4. The method of claim 1, further comprising: in response to the reference objects being in an acquired references state, while preventing new owners from obtaining reference objects, unmarking each of the entries for the strings in the interned string table;
    marking the entries for the strings in the interned string table that are referenced by the reference objects; and
    deleting any unmarked entries in the interned string table.

5. The method of claim 1, wherein the garbage collection is performed in a distributed environment and further comprising:
    designating one node in a set of nodes in the distributed environment as a master node;
    designating the remaining nodes in the set of nodes as follower nodes;
    and in response to the master node or one of the follower nodes starting the garbage collection, starting garbage collection at each of the remaining nodes.

6. A system for a garbage-collected interned string table, comprising:
    a processor;
    and a storage device coupled to the processor, wherein the storage device stores a program, and wherein the processor is configured to execute the program code to perform operations, the operations comprising:
    creating reference objects that each reference at least one of the strings in the interned string table;
    marking the reference objects with a current generation;
    marking the strings referenced by the reference objects in the interned string table with the current generation, wherein each of the strings is marked with a generation that is a same generation as that of a reference object that last referenced that string;
    and performing garbage collection by:
    advancing the current generation to a next generation;
    in response to the reference objects in a previous generation from the current generation advancing to an acquired references state, promoting the reference objects and the strings referenced by the reference objects in the previous generation to the current generation;
    determining whether an ephemeral reference object has been created that serves as a token to hold off the garbage collection of the previous generation;
    in response to determining that the ephemeral reference object has been created, holding off on deleting all of the strings that are marked with the previous generation in the interned string table until the ephemeral reference object has been unregistered;

and in response to determining that the ephemeral reference object has not been created, deleting the strings that are marked with the previous generation in the interned string table.

7. The system of claim 6, wherein the operations further comprise:

for one of the reference objects, registering the reference object as acquiring references;

acquiring the references to the strings in the interned string table;

re-registering the reference object as having acquired the references to the strings;

and after using the strings in the interned string table, un-registering the reference object by notifying the string reference monitor that the reference object is not active.

8. The system of claim 6, wherein one of the reference objects implements a reference interface to allow obtaining the strings referenced by that reference object and wherein the operations further comprise:

obtaining a list of the strings referenced by that reference object using the reference interface.

9. The system of claim 6, wherein the operations further comprise:

in response to the reference objects being in an acquired references state, while preventing new owners from obtaining reference objects, unmarking each of the entries for the strings in the interned string table;

marking the entries for the strings in the interned string table that are referenced by the reference objects;

and deleting any unmarked entries in the interned string table.

10. The system of claim 6, wherein the garbage collection is performed in a distributed environment and wherein the operations further comprise:

designating one node in a set of nodes in the distributed environment as a master node;

designating the remaining nodes in the set of nodes as follower nodes;

and in response to the master node or one of the follower nodes starting the garbage collection, starting garbage collection at each of the remaining nodes.

11. A computer program product for a garbage-collected interned string table, wherein the computer program product comprises a non-transitory computer readable storage medium including a computer readable program, wherein the computer readable program when executed by a processor on a computer causes the computer to perform:

creating reference objects that each reference at least one of the strings in the interned string table;

marking the reference objects with a current generation;

marking the strings referenced by the reference objects in the interned string table with the current generation, wherein each of the strings is marked with a generation that is a same generation as that of a reference object that last referenced that string;

and performing garbage collection by:

advancing the current generation to a next generation;

in response to the reference objects in a previous generation from the current generation advancing to an acquired references state, promoting the reference objects and the strings referenced by the reference objects in the previous generation to the current generation;

determining whether an ephemeral reference object has been created that serves as a token to hold off the garbage collection of the previous generation;

in response to determining that the ephemeral reference object has been created, holding off on deleting all of the strings that are marked with the previous generation in the interned string table until the ephemeral reference object has been unregistered;

and in response to determining that the ephemeral reference object has not been created, deleting the strings that are marked with the previous generation in the interned string table.

12. The computer program product of claim 11, wherein the computer readable program when executed by the processor on the computer causes the computer to perform:

for one of the reference objects, registering the reference object as acquiring references;

acquiring the references to the strings in the interned string table;

re-registering the reference object as having acquired the references to the strings;

and after using the strings in the interned string table, un-registering the reference object by notifying the string reference monitor that the reference object is not active.

13. The computer program product of claim 11, wherein one of the reference objects implements a reference interface to allow obtaining the strings referenced by that reference object and wherein the computer readable program when executed by the processor on the computer causes the computer to perform:

obtaining a list of the strings referenced by that reference object using the reference interface.

14. The computer program product of claim 11, wherein the computer readable program when executed by the processor on the computer causes the computer to perform:

in response to the reference objects being in an acquired references state, while preventing new owners from obtaining reference objects, unmarking each of the entries for the strings in the interned string table;

marking the entries for the strings in the interned string table that are referenced by the reference objects;

and deleting any unmarked entries in the interned string table.

15. The computer program product of claim 11, wherein the garbage collection is performed in a distributed environment and wherein the computer readable program when executed by the processor on the computer causes the computer to perform:

designating one node in a set of nodes in the distributed environment as a master node;

designating the remaining nodes in the set of nodes as follower nodes;

and in response to the master node or one of the follower nodes starting the garbage collection, starting garbage collection at each of the remaining nodes.

* * * * *